(12) United States Patent
Jimbo

(10) Patent No.: US 9,742,936 B2
(45) Date of Patent: Aug. 22, 2017

(54) INFORMATION PROCESSING APPARATUS, INFORMATION PROCESSING METHOD, AND INFORMATION PROCESSING SYSTEM UTILIZING CORRESPONDENCE INFORMATION INDICATING TIME INFORMATION OR FREQUENCY INFORMATION

(71) Applicant: Junya Jimbo, Tokyo (JP)

(72) Inventor: Junya Jimbo, Tokyo (JP)

(73) Assignee: Ricoh Company, Ltd, Tokyo (JP)

( * ) Notice: Subject to any disclaimer, the term of this patent is extended or adjusted under 35 U.S.C. 154(b) by 0 days.

(21) Appl. No.: 15/163,087

(22) Filed: May 24, 2016

(65) Prior Publication Data

US 2016/0366291 A1 Dec. 15, 2016

(30) Foreign Application Priority Data

Jun. 9, 2015 (JP) ................................. 2015-116793

(51) Int. Cl.
  *H04N 1/00* (2006.01)
(52) U.S. Cl.
  CPC . *H04N 1/00244* (2013.01); *H04N 2201/0039* (2013.01); *H04N 2201/0094* (2013.01)
(58) Field of Classification Search
  CPC .................................................. H04N 1/00244
  USPC ...................................................... 358/1.15
  See application file for complete search history.

(56) References Cited

U.S. PATENT DOCUMENTS

| 2007/0013751 A1* | 1/2007 | Maemura | ........... G03G 15/5016 347/84 |
| 2011/0102841 A1* | 5/2011 | Morita | ............... H04N 1/00244 358/1.15 |
| 2015/0278643 A1 | 10/2015 | Hirokawa | |

FOREIGN PATENT DOCUMENTS

| JP | 2012-003659 | 1/2012 |
| JP | 2015-185100 | 10/2015 |

* cited by examiner

*Primary Examiner* — Jacky X Zheng
(74) *Attorney, Agent, or Firm* — Oblon, McClelland, Maier & Neustadt, L.L.P.

(57) ABSTRACT

A storage unit stores, for each state of an information processing apparatus, pieces of correspondence information indicating either a correspondence relation between pieces of content identification information and time information indicating latest times when the contents are displayed, or a correspondence relation between the pieces of content identification information and frequency information representing display frequencies of the contents. A selection unit selects the correspondence information corresponding to a current state of the information processing apparatus. A determining unit determines, as display content information identifying the content to be displayed, content identification information out of the pieces of content identification information included in the selected correspondence information, based on the time information or the frequency information corresponding to the pieces of content identification information included in selected the correspondence information. A display control unit performs control to display the content identified by the determined display content information.

9 Claims, 14 Drawing Sheets

FIG.5

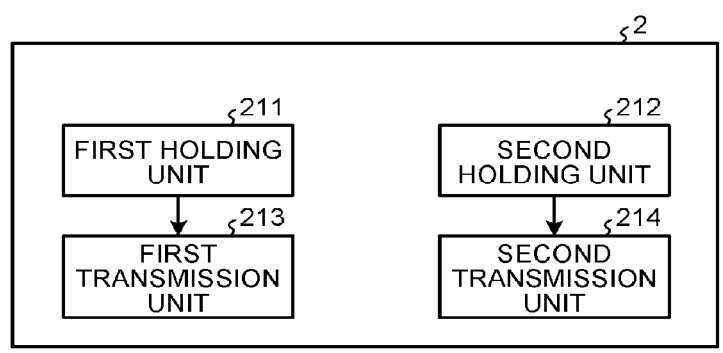

FIG.6

| CONTENT NAME | COPIER STATE | SCANNER STATE | PRINTER STATE | FACSIMILE STATE | LOGIN STATE | AUTOMATIC RESET STATE |
|---|---|---|---|---|---|---|
| CONTENT A | true | false | false | true | false | true |
| CONTENT B | false | true | true | false | false | false |
| CONTENT C | false | true | true | true | false | false |
| CONTENT D | true | false | true | true | false | false |
| CONTENT E | false | false | true | false | true | false |
| CONTENT F | true | false | false | true | false | true |

STATE OF MFP 1: COPIER STATE

| CONTENT NAME | TIME INFORMATION |
|---|---|
| CONTENT A | 0000-00-00 00:00 |
| CONTENT D | 0000-00-00 00:00 |
| CONTENT F | 0000-00-00 00:00 |

| DESIGNATION INFORMATION |
|---|
| CONTENT A |

STATE OF MFP 1: SCANNER STATE

| CONTENT NAME | TIME INFORMATION |
|---|---|
| CONTENT B | 0000-00-00 00:00 |
| CONTENT C | 0000-00-00 00:00 |

| DESIGNATION INFORMATION |
|---|
| CONTENT B |

FIG.10

STATE OF MFP 1: PRINTER STATE

| CONTENT NAME | TIME INFORMATION |
|---|---|
| CONTENT B | 0000-00-00 00:00 |
| CONTENT C | 0000-00-00 00:00 |
| CONTENT D | 0000-00-00 00:00 |
| CONTENT E | 0000-00-00 00:00 |

| DESIGNATION INFORMATION |
|---|
| CONTENT B |

FIG.11

STATE OF MFP 1: FACSIMILE STATE

| CONTENT NAME | TIME INFORMATION |
|---|---|
| CONTENT A | 0000-00-00 00:00 |
| CONTENT C | 0000-00-00 00:00 |
| CONTENT D | 0000-00-00 00:00 |
| CONTENT F | 0000-00-00 00:00 |

| DESIGNATION INFORMATION |
|---|
| CONTENT A |

FIG.12

STATE OF MFP 1: LOGIN STATE

| CONTENT NAME | TIME INFORMATION |
|---|---|
| CONTENT E | 0000-00-00 00:00 |

| DESIGNATION INFORMATION |
|---|
| CONTENT E |

FIG.13

STATE OF MFP 1: AUTOMATIC RESET STATE

| CONTENT NAME | TIME INFORMATION |
|---|---|
| CONTENT A | 0000-00-00 00:00 |
| CONTENT F | 0000-00-00 00:00 |

| DESIGNATION INFORMATION |
|---|
| CONTENT A |

FIG.14

STATE OF MFP 1: COPIER STATE

| CONTENT NAME | TIME INFORMATION |
|---|---|
| CONTENT A | xxxx-xx-xx xx:xx |
| CONTENT D | 0000-00-00 00:00 |
| CONTENT F | 0000-00-00 00:00 |

| DESIGNATION INFORMATION |
|---|
| CONTENT D |

FIG.15

STATE OF MFP 1: COPIER STATE

| CONTENT NAME | TIME INFORMATION |
|---|---|
| CONTENT A | xxxx-xx-xx xx:xx |
| CONTENT D | yyyy-yy-yy yy:yy |
| CONTENT F | 0000-00-00 00:00 |

| DESIGNATION INFORMATION |
|---|
| CONTENT F |

FIG.16

STATE OF MFP 1: COPIER STATE

| CONTENT NAME | TIME INFORMATION |
|---|---|
| CONTENT A | xxxx-xx-xx xx:xx |
| CONTENT D | yyyy-yy-yy yy:yy |
| CONTENT F | zzzz-zz-zz zz:zz |

| DESIGNATION INFORMATION |
|---|
| CONTENT A |

FIG.17

STATE OF MFP 1: COPIER STATE

| CONTENT NAME | TIME INFORMATION |
|---|---|
| CONTENT A | aaaa-aa-aa aa:aa |
| CONTENT D | yyyy-yy-yy yy:yy |
| CONTENT F | zzzz-zz-zz zz:zz |

| DESIGNATION INFORMATION |
|---|
| CONTENT D |

FIG.18

STATE OF MFP 1: COPIER STATE

| CONTENT NAME | TIME INFORMATION |
|---|---|
| CONTENT A | 2015-01-10 10:00 |
| CONTENT D | 0000-00-00 00:00 |
| CONTENT F | 0000-00-00 00:00 |

| DESIGNATION INFORMATION |
|---|
| CONTENT D |

FIG.19

STATE OF MFP 1: AUTOMATIC RESET STATE

| CONTENT NAME | TIME INFORMATION |
|---|---|
| CONTENT A | 2015-01-10 10:00 |
| CONTENT F | 0000-00-00 00:00 |

| DESIGNATION INFORMATION |
|---|
| CONTENT F |

FIG.20

STATE OF MFP 1: AUTOMATIC RESET STATE

| CONTENT NAME | TIME INFORMATION |
|---|---|
| CONTENT A | 2015-01-10 10:00 |
| CONTENT F | 2015-01-10 13:15 |

| DESIGNATION INFORMATION |
|---|
| CONTENT A |

FIG.21

STATE OF MFP 1: FACSIMILE STATE

| CONTENT NAME | TIME INFORMATION |
|---|---|
| CONTENT A | 2015-01-12 18:00 |
| CONTENT C | 0000-00-00 00:00 |
| CONTENT D | 2015-01-10 10:01 |
| CONTENT F | 2015-01-10 13:15 |

| DESIGNATION INFORMATION |
|---|
| CONTENT A |

FIG.22

STATE OF MFP 1: FACSIMILE STATE

| CONTENT NAME | TIME INFORMATION |
|---|---|
| CONTENT A | 2015-01-12 18:00 |
| CONTENT C | 2015-01-15 19:00 |
| CONTENT D | 2015-01-10 10:01 |
| CONTENT F | 2015-01-10 13:15 |

| DESIGNATION INFORMATION |
|---|
| CONTENT D |

FIG.24

STATE OF MFP 1: COPIER STATE

| CONTENT NAME | FREQUENCY INFORMATION |
|---|---|
| CONTENT A | 0 |
| CONTENT D | 0 |
| CONTENT F | 0 |

| DESIGNATION INFORMATION |
|---|
| CONTENT A |

FIG.25

STATE OF MFP 1: SCANNER STATE

| CONTENT NAME | FREQUENCY INFORMATION |
|---|---|
| CONTENT B | 0 |
| CONTENT C | 0 |

| DESIGNATION INFORMATION |
|---|
| CONTENT B |

FIG.26

STATE OF MFP 1: PRINTER STATE

| CONTENT NAME | FREQUENCY INFORMATION |
|---|---|
| CONTENT B | 0 |
| CONTENT C | 0 |
| CONTENT D | 0 |
| CONTENT E | 0 |

| DESIGNATION INFORMATION |
|---|
| CONTENT B |

FIG.27

STATE OF MFP 1: FACSIMILE STATE

| CONTENT NAME | FREQUENCY INFORMATION |
|---|---|
| CONTENT A | 0 |
| CONTENT C | 0 |
| CONTENT D | 0 |
| CONTENT F | 0 |

| DESIGNATION INFORMATION |
|---|
| CONTENT A |

FIG.28

STATE OF MFP 1: LOGIN STATE

| CONTENT NAME | FREQUENCY INFORMATION |
|---|---|
| CONTENT E | 0 |

| DESIGNATION INFORMATION |
|---|
| CONTENT E |

FIG.29

STATE OF MFP 1: AUTOMATIC RESET STATE

| CONTENT NAME | FREQUENCY INFORMATION |
|---|---|
| CONTENT A | 0 |
| CONTENT F | 0 |

| DESIGNATION INFORMATION |
|---|
| CONTENT A |

STATE OF MFP 1: COPIER STATE

| CONTENT NAME | FREQUENCY INFORMATION |
|---|---|
| CONTENT A | 1 |
| CONTENT D | 0 |
| CONTENT F | 0 |

| DESIGNATION INFORMATION |
|---|
| CONTENT D |

STATE OF MFP 1: AUTOMATIC RESET STATE

| CONTENT NAME | FREQUENCY INFORMATION |
|---|---|
| CONTENT A | 1 |
| CONTENT F | 0 |

| DESIGNATION INFORMATION |
|---|
| CONTENT F |

FIG.33

STATE OF MFP 1: AUTOMATIC RESET STATE

| CONTENT NAME | FREQUENCY INFORMATION |
|---|---|
| CONTENT A | 1 |
| CONTENT F | 1 |

| DESIGNATION INFORMATION |
|---|
| CONTENT A |

FIG.34

STATE OF MFP 1: FACSIMILE STATE

| CONTENT NAME | FREQUENCY INFORMATION |
|---|---|
| CONTENT A | 2 |
| CONTENT C | 0 |
| CONTENT D | 1 |
| CONTENT F | 1 |

| DESIGNATION INFORMATION |
|---|
| CONTENT A |

FIG.35

STATE OF MFP 1: FACSIMILE STATE

| CONTENT NAME | FREQUENCY INFORMATION |
|---|---|
| CONTENT A | 2 |
| CONTENT C | 1 |
| CONTENT D | 1 |
| CONTENT F | 1 |

| DESIGNATION INFORMATION |
|---|
| CONTENT D |

INFORMATION PROCESSING APPARATUS, INFORMATION PROCESSING METHOD, AND INFORMATION PROCESSING SYSTEM UTILIZING CORRESPONDENCE INFORMATION INDICATING TIME INFORMATION OR FREQUENCY INFORMATION

CROSS-REFERENCE TO RELATED APPLICATIONS

The present application claims priority under 35 U.S.C. §119 to Japanese Patent Application No. 2015-116793 filed on Jun. 9, 2015. The contents of which are incorporated herein by reference in their entirety.

BACKGROUND OF THE INVENTION

1. Field of the Invention

The present invention relates to information processing apparatuses, information processing methods, and information processing systems.

2. Description of the Related Art

Typically, techniques have been known that display contents (e.g., information for notification to users such as advertisements) in accordance with the states of apparatuses such as multifunction peripherals (MFPs).

SUMMARY OF THE INVENTION

According to one aspect of the present invention, an information processing apparatus includes a storage unit, a selection unit, a determining unit, and a display control unit. The storage unit stores, for each of a plurality of states of the information processing apparatus, pieces of correspondence information indicating either a correspondence relation between one or more pieces of content identification information respectively identifying one or more contents and time information indicating latest times when the contents are displayed, or a correspondence relation between the one or more pieces of content identification information and frequency information representing display frequencies of the contents. The selection unit selects correspondence information corresponding to a current state of the information processing apparatus out of the pieces of correspondence information stored in the storage unit. The determining unit determines, as display content information that identifies the content to be displayed, a piece of content identification information out of the one or more pieces of content identification information included in the correspondence information selected by the selection unit, based on the time information or the frequency information that corresponds to the one or more pieces of content identification information included in the correspondence information selected by the selection unit. The display control unit performs control to display the content identified by the display content information determined by the determining unit.

BRIEF DESCRIPTION OF THE DRAWINGS

FIG. 5 is a schematic diagram illustrating exemplary functions of the content distribution server;

FIG. 6 is a schematic diagram illustrating an example of content information;

FIG. 10 is a schematic diagram illustrating an example of the correspondence information corresponding to a printer state;

FIG. 11 is a schematic diagram illustrating an example of the correspondence information corresponding to a facsimile state;

FIG. 12 is a schematic diagram illustrating an example of the correspondence information corresponding to a login state;

FIG. 13 is a schematic diagram illustrating an example of the correspondence information corresponding to an automatic reset state;

FIG. 14 is a schematic diagram illustrating another example of the correspondence information corresponding to the copier state;

FIG. 15 is a schematic diagram illustrating another example of the correspondence information corresponding to the copier state;

FIG. 16 is a schematic diagram illustrating another example of the correspondence information corresponding to the copier state;

FIG. 17 is a schematic diagram illustrating another example of the correspondence information corresponding to the copier state;

FIG. 18 is a schematic diagram illustrating another example of the correspondence information corresponding to the copier state;

FIG. 19 is a schematic diagram illustrating another example of the correspondence information corresponding to the automatic reset state;

FIG. 20 is a schematic diagram illustrating another example of the correspondence information corresponding to the automatic reset state;

FIG. 21 is a schematic diagram illustrating another example of the correspondence information corresponding to the facsimile state;

FIG. 22 is a schematic diagram illustrating another example of the correspondence information corresponding to the facsimile state;

FIG. 24 is a schematic diagram illustrating another example of the correspondence information corresponding to the copier state;

FIG. 25 is a schematic diagram illustrating another example of the correspondence information corresponding to the scanner state;

FIG. 26 is a schematic diagram illustrating another example of the correspondence information corresponding to the printer state;

FIG. 27 is a schematic diagram illustrating another example of the correspondence information corresponding to the facsimile state;

FIG. 28 is a schematic diagram illustrating another example of the correspondence information corresponding to the login state;

FIG. 29 is a schematic diagram illustrating another example of the correspondence information corresponding to the automatic reset state;

FIG. 33 is a schematic diagram illustrating another example of the correspondence information corresponding to the automatic reset state;

FIG. 34 is a schematic diagram illustrating another example of the correspondence information corresponding to the facsimile state;

FIG. 35 is a schematic diagram illustrating another example of the correspondence information corresponding to the facsimile state.

The accompanying drawings are intended to depict exemplary embodiments of the present invention and should not be interpreted to limit the scope thereof. Identical or similar reference numerals designate identical or similar components throughout the various drawings.

DETAILED DESCRIPTION OF THE PREFERRED EMBODIMENTS

Figure 1:
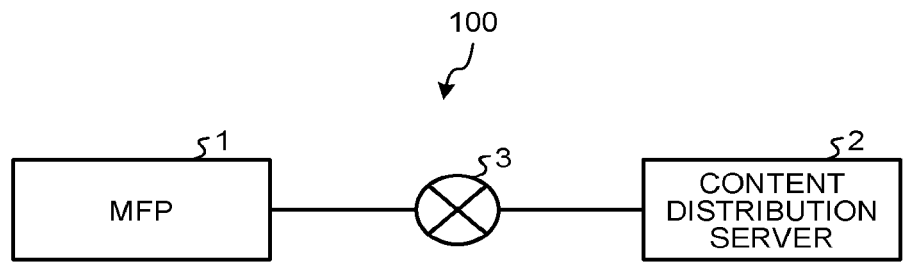
FIG. 1 is a schematic diagram illustrating an exemplary structure of an information processing system.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

Embodiments of the present invention will be described in detail below with reference to the drawings.

An object of embodiments is to provide an information processing apparatus, an information processing method, and an information processing system that can more equally allocate a display opportunity to all of the contents.

The following describes embodiments of an information processing apparatus, an information processing method, a computer program, and an information processing system according to the present invention in detail with reference to the accompanying drawings. In the following embodiments, the information processing apparatus according to the present invention is applied to a multifunction peripheral (MFP). However, the embodiments are not limited thereto. The MFP has a plurality of different functions such as copier, scanner, printer, and facsimile functions.

First Embodiment

FIG. 1 is a schematic diagram illustrating an exemplary structure of an information processing system 100 in a first embodiment. As illustrated in FIG. 1, the information processing system 100 includes an MFP 1 and a content distribution server 2. The MFP 1 and the content distribution server 2 are coupled to each other via a network 3. The content distribution server 2 is an apparatus that manages and distributes contents. The specific structure is described later. In the present specification, the "content" represents information for notification to users such as advertisements, advertisements on the apparatus, in-company notifications, and information about the apparatus. In the present example, the content distribution server 2 corresponds to "server" in the claims while the information processing system 100 corresponds to "system" in the claims.

Figure 2:
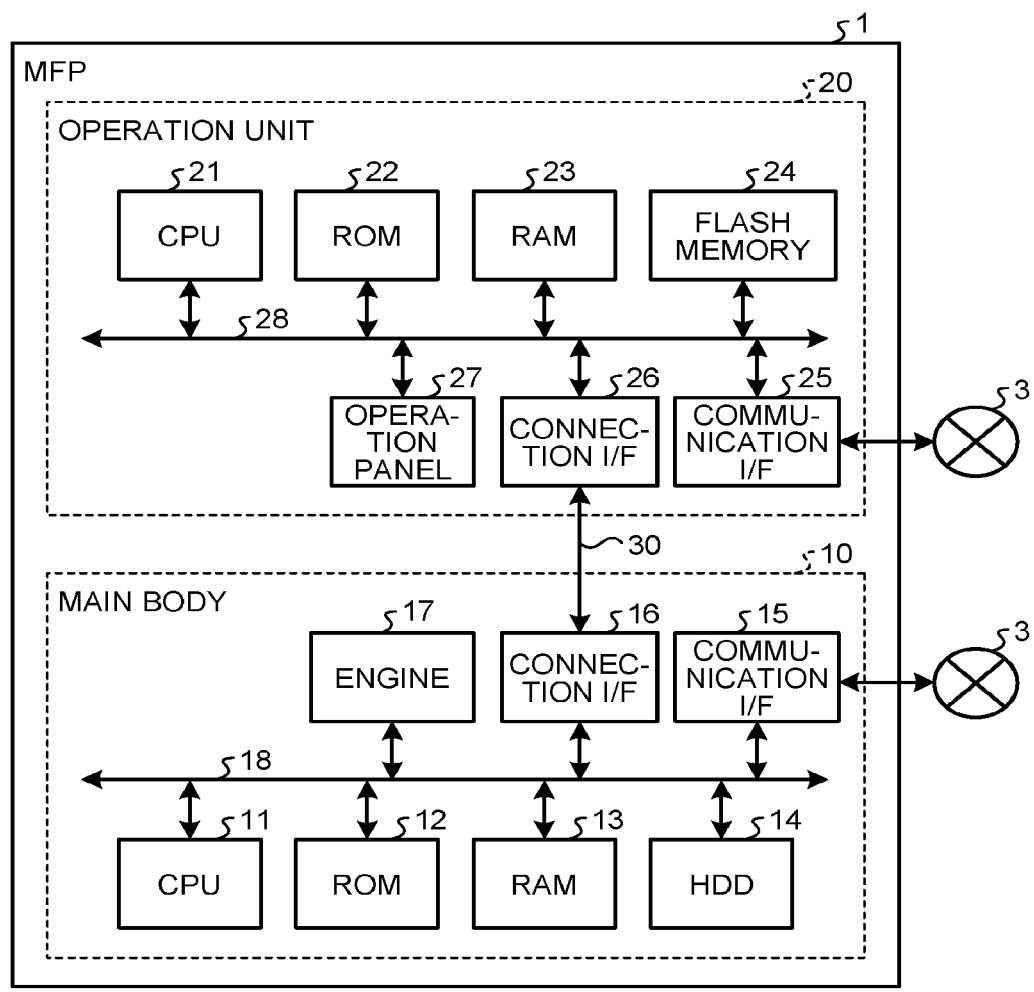
FIG. 2 is a schematic diagram illustrating an exemplary hardware structure of a multifunction peripheral (MFP)

FIG. 2 is a schematic diagram illustrating an exemplary hardware structure of the MFP 1. As illustrated in FIG. 2, the MFP 1 includes a main body 10 that can implement various functions such as the copier, scanner, facsimile, and printer functions, and an operation unit 20 that receives input according to the user's operation. The main body 10 and the operation unit 20 are coupled via a dedicated communication path 30 so as to enable communication with each other. The communication path 30 is compliant with a universal serial bus (USB) standard, for example. The communication path 300 may be compliant with any standard regardless of a wire-based or wireless communication scheme.

The main body 10 can operate in accordance with the input received by the operation unit 20. The main body 10 can communicate with an external apparatus such as a client personal computer (PC) and also operate in accordance with an instruction received from the external apparatus.

The following describes a hardware structure of the main body 10. As illustrated in FIG. 2, the main body 10 includes a central processing unit (CPU) 11, a read only memory (ROM) 12, a random access memory (RAM) 13, a hard disk drive (HDD) 14, a communication interface (I/F) 15, a connection I/F 16, and an engine 17. These components are coupled with one another via a system bus 18.

The CPU 11 overall controls the operation of the main body 10. The CPU 11 executes a computer program stored in the ROM 12 or the HDD 14, for example, using the RAM 13 as a working area to control the overall operation of the main body 10, thereby implementing the various functions such as the copier, scanner, facsimile, and printer functions.

The communication I/F 15 is an interface to connect the main body 10 to the network 3. The connection I/F 16 is an interface to communicate with the operation unit 20 via the communication path 30.

The engine 17 is hardware that performs versatile information processing and processing other than communication for implementing the copier, scanner, facsimile, and printer functions. The engine 17 includes a scanner (image reading section) that scans and reads an image on a document, a plotter (image forming section) that performs printing on a sheet material such as a sheet, and a facsimile section that performs facsimile communication, for example. The engine 17 may further include specific options such as a finisher that sorts the sheet materials after printing and an automatic document feeder (ADF) that automatically feeds documents.

The following describes a hardware structure of the operation unit 20. As illustrated in FIG. 2, the operation unit 20 includes a CPU 21, a ROM 22, a RAM 23, a flash memory 24, a communication I/F 25, a connection I/F 26, and an operation panel 27. These components are coupled with one another via a system bus 28.

The CPU 21 overall controls the operation of the operation unit 20. The CPU 21 executes a computer program stored in the ROM 22 or the flash memory 24, for example, using the RAM 23 as a working area to control the overall operation of the operation unit 20, thereby implementing various functions such as displaying of information (images) according to the input received from a user. The functions are described later.

The communication I/F 25 is an interface to connect the operation unit 20 to the network 3. The connection I/F 26 is an interface to communicate with the main body 10 via the communication path 30.

The operation panel 27 receives various types of input according to the user's operation and displays various types of information (e.g., information according to the received input, information indicating an operation status of the MFP 1, and information indicating a setting condition). While in the present example, the operation panel 27 includes a liquid crystal display (LCD) having a touch panel function, but the embodiment is, however, not limited thereto. For example, the operation panel 27 may include an organic electroluminescence (EL) display having a touch panel function. Furthermore, the operation panel 27 may be provided with an operation unit such as hardware keys and a display unit such as a lamp in addition to or instead of the display having a touch panel function.

Figure 3:
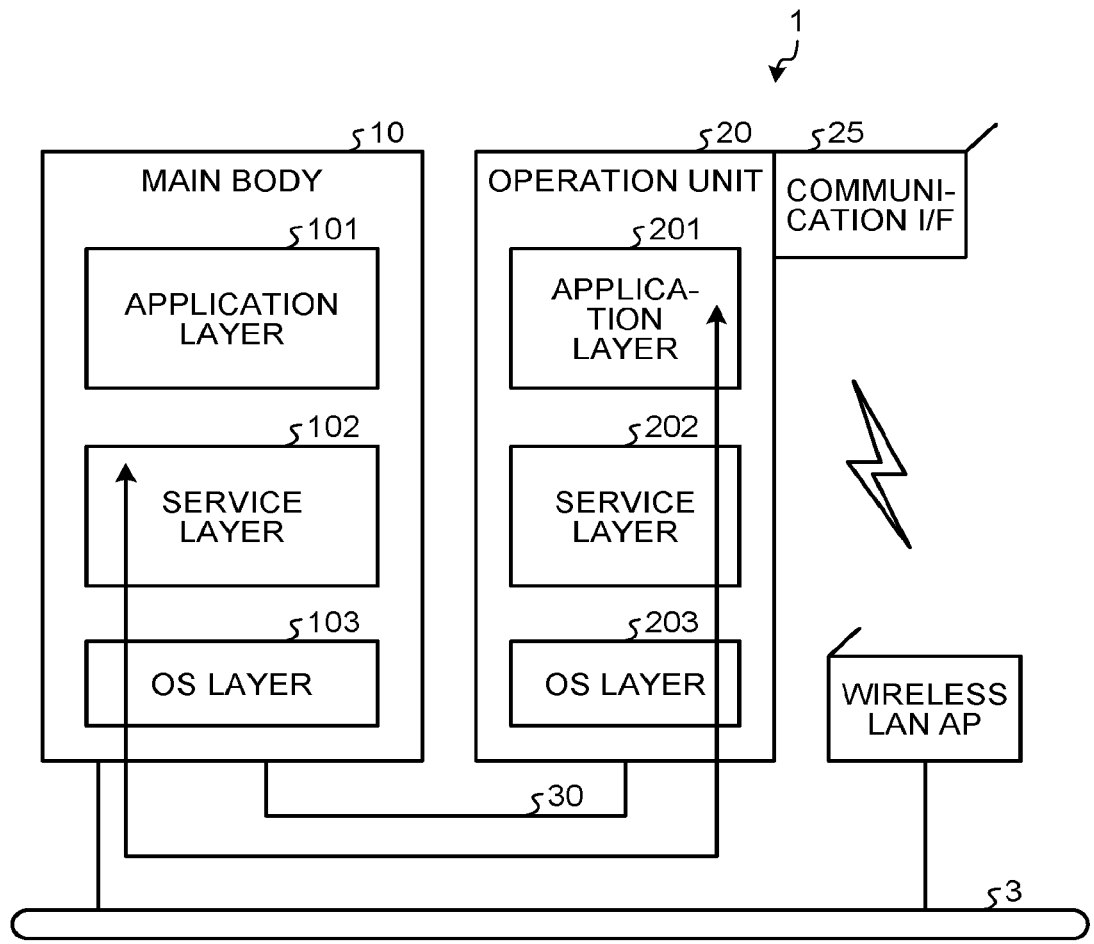
FIG. 3 is a schematic diagram illustrating an exemplary software structure of the MFP.

The following describes a software structure of the MFP 1. FIG. 3 is a schematic diagram illustrating an exemplary software structure of the MFP 1. As illustrated in FIG. 3, the main body 10 includes an application layer 101, a service layer 102, and an OS layer 103. The application layer 101, the service layer 102, and the OS layer 103 are in fact various types of software stored in the ROM 12 and the HDD 14, for example. The CPU 11 executes the various types of software to provide the various functions.

The application layer 101 is application software (in the following description, may be described simply as the "application" in some cases) that causes the hardware resources to operate and provide a certain function. Examples of the application include a copier application that provides the copier function, a scanner application that provides the scanner function, a facsimile application that provides the facsimile function, and a printer application that provides the printer function.

The service layer 102, which is present between the application layer 101 and the OS layer 103, is software that provides an interface to the applications for using the hardware resources included in the main body 10. More specifically, the service layer 102 receives requests to operate the hardware resources and provides a function to arbitrate the operation requests. Examples of the operation requests received by the service layer 102 include a request for the scanner to perform reading and a request for the plotter to perform printing.

The interface function of the service layer 102 is provided to not only the application layer 101 of the main body 10 but also an application layer 201 of the operation unit 20. The application layer 201 (application) of the operation unit 20 thus can also implement the functions using the hardware resources (e.g., the engine 17) of the main body 10 via the interface function of the service layer 102.

The OS layer 103 is basic software (operating system) that provides a basic function to control the hardware included in the main body 10. The service layer 102, which is software, converts requests to use the hardware resources from the various applications into commands that the OS layer 103 can interpret, and then transfers the commands to the OS layer 103. The OS layer 103, which is software, executes the commands. As a result, the hardware resources operate in accordance with the requests from the applications.

The operation unit 20 includes the application layer 201, a service layer 202, and an OS layer 203. The hierarchical structure among the application layer 201, the service layer 202, and the OS layer 203 of the operation unit 20 is the same as that of the main body 10. The function provided by the application of the application layer 201 and the type of operation request that the service layer 202 can receive differ from those in the main body 10. The application layer 201 is software that mainly provides a function of a user interface (UI) to operate or display the functions (copier, scanner, facsimile, and printer functions) included in the main body 10. The application layer 201 may be software that operates the hardware resource included in the operation unit 20 to provide a certain function.

Examples of the application of the application layer 201 included in the operation unit 20 include a printer application that provides a UI interface function to operate or display the printer function, a scanner application that provides a UI interface function to operate or display the scanner function, a copier application that provides a UI interface function to operate or display the copier function, a facsimile application that provides a UI interface function to operate or display the facsimile function, an energy saving state management application that provides a UI interface function to set or display energy-saving recovery, a login event management application that provides a UI interface function to set or display login events, and a signage client application that provides a UI interface function to display contents corresponding to the state of the MFP 1 determined by the user's operation and the operation of the MFP 1. The examples are, however, not limited to those described above. The signage client application, which is described in detail later, implements a function that acquires (downloads) a content from the content distribution server 2 and displays the content according to the state of the MFP 1.

Referring back to FIG. 3, in the first embodiment, the software of the OS layer 103 of the main body 10 and the software of the OS layer 203 of the operation unit 20 differ from each other in order to keep independence between the functions of the main body 10 and the operation unit 20. The main body 10 and the operation unit 20 thus operate independently from each other under the different operating systems. For example, Linux (registered trademark) may be adopted as the software of the OS layer 103 of the main body 10, while Android (registered trademark) may be adopted as the software of the OS layer 203 of the operation unit 20.

As described above, the main body 10 and the operation unit 20 operate under different operating systems in the MFP 1 in the first embodiment. The communication between the main body 10 and the operation unit 20 thus is not performed as an inter-process communication in the common apparatus, but as a communication between different apparatuses. Examples of the communication between different apparatuses include the operation (command communication) that transmits the input (the content of the instruction from the user) received by the operation unit 20 to the main body 10, and the operation of the main body 10 to notify the operation unit 20 of an event. The operation unit 20 thus can use the functions of the main body 10 by performing the command communication with the main body 10. Examples of an event of which the operation unit 20 is notified by the main body 10 include an implementation state of the operation in the main body 10 and contents set by the main body 10.

In the first embodiment, power is supplied to the operation unit 20 from the main body 10 via the communication path 30, thereby making it possible to perform power supply control separately (independently) for the operation unit 20 and the main body 10.

Figure 4:
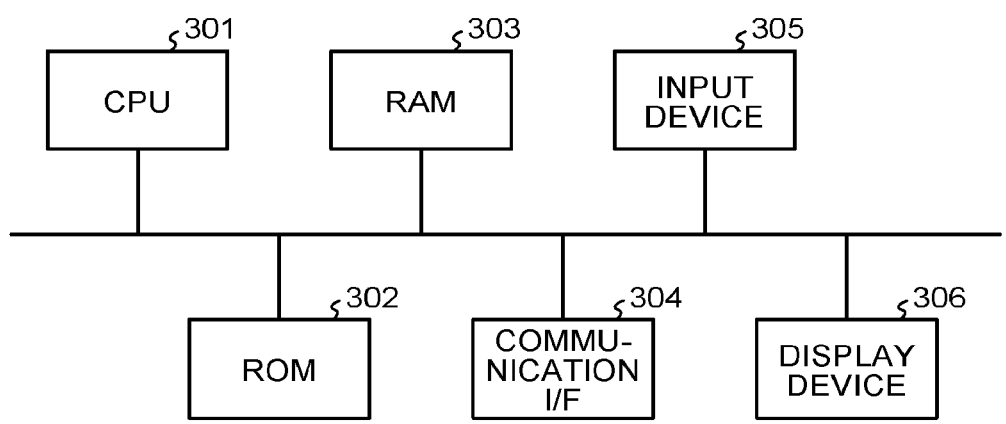
FIG. 4 is a schematic diagram illustrating an exemplary hardware structure of a content distribution server.

The following describes the content distribution server 2. FIG. 4 is a schematic diagram illustrating an exemplary hardware structure of the content distribution server 2. As illustrated in FIG. 4, the content distribution server 2 includes a CPU 301, a ROM 302, a RAM 303, a communication I/F 304, an input device 305, and a display device 306. The CPU 301 overall controls the operation of the content distribution server 2. The ROM 302 is a non-volatile memory that stores therein various types of data such as programs. The RAM 303 is a volatile memory that functions as a working area of various types of processing executed by the CPU 301. The communication I/F 304 is an interface to connect the content distribution server 2 to the network 3. The input device 305 is used for the user's operation input. The input device 305 includes a mouse and a keyboard, for example. The display device 306 displays various types of information. The display device 306 includes a liquid crystal display, for example.

FIG. 5 is a schematic diagram illustrating exemplary functions of the content distribution server 2. As illustrated in FIG. 5, the content distribution server 2 includes a first holding unit 211, a second holding unit 212, a first transmission unit 213, and a second transmission unit 214.

The first holding unit 211 holds content information in which each of a plurality of pieces of content identification information each identifying any one out of a plurality of contents is associated with at least one or more states of the MFP 1, and which indicates that when the MFP 1 is placed in any of such one or more states, the content identified by the content information is to be displayed. In the example illustrated in FIG. 6, a content name that represents the name of the content is used as an example of the content identification information. The content identification information is, however, not limited thereto.

In the example illustrated in FIG. 6, six states (a "copier state", a "scanner state", a "printer state", a "facsimile state", a "login state", and an "automatic reset state") are allocated for each of the content names. Out of the six states, the state set to "true" represents that when the MFP 1 is placed in that state, the content identified by the content name is to be displayed. The following describes an exemplary case where the content name is "content A". In the example illustrated in FIG. 6, the three states of the "copier state", "facsimile state", and "automatic reset state" out of the six states allocated to the content name "content A" are set to "true". Thus, when the MFP 1 is placed in any of the three states of the "copier state", "facsimile state", and "automatic reset state", the content identified by the content name "content A" is to be displayed. The other contents identified by their content names are the same as those described above.

In the present example, the "copier state" corresponds to a state when the operation unit 20 receives the user's operation that instructs the execution of copying and also corresponds to a state in which copying is being executed. The "scanner state" corresponds to a state when the operation unit 20 receives the user's operation that instructs the execution of scan and also corresponds to a state in which scan is being executed. The "printer state" corresponds to a state when the MFP 1 starts image printing processing. The "facsimile state" corresponds to a state when the operation unit 20 receives the user's operation that instructs the execution of facsimile transmission and also corresponds to a state in which facsimile transmission is being executed. The "login state" corresponds to a state when the user starts operation of login processing on the operation unit 20 and also corresponds to a state in which the login processing is being executed. The "automatic reset state" corresponds to a state when the MFP 1 starts automatic reset processing and also corresponds to a state in which the automatic reset processing is being executed. Herein, the automatic reset is the processing that initializes an operation screen after a certain time elapses from a time when the user stops a certain operation on the operation screen of the MFP 1 or a time when a job relating to the MFP 1 ends. The states of the MFP 1 allocated to each content name are not limited to those in the example illustrated in FIG. 6. The states of the MFP 1 can be arbitrarily changed.

Referring back to FIG. 5, the second holding unit 212 holds a plurality of contents respectively corresponding to a plurality of pieces of content identification information included in the content information. For example, when the content information is the content information illustrated in FIG. 6, the second holding unit 212 holds six contents each corresponding to one of "content A" to "content F". More specifically, the second holding unit 212 holds the content identified by the content name "content A", the content identified by the content name "content B", the content identified by the content name "content C", the content identified by the content name "content D", the content identified by the content name "content E", and the content identified by the content name "content F".

The first transmission unit 213 transmits the content information held in the first holding unit 211 to the MFP 1 in accordance with a request from the MFP 1. The second transmission unit 214 transmits the plurality of contents held in the second holding unit 212 to the MFP 1 in accordance with a request from the MFP 1.

In the first embodiment, the functions of the respective units (e.g., the first transmission unit 213 and the second transmission unit 214) of the content distribution server 2 are implemented by the CPU 301 executing a computer program stored in the ROM 302, for example. The functions are not limited to being implemented as described above. At least a part of the functions of the respective units of the content distribution server 2 may be implemented by a dedicated hardware circuit (e.g., a semiconductor integrated circuit), for example. The first holding unit 211 and the second holding unit 212 are implemented by a storage device such as the ROM 302, for example. The first holding unit 211 and the second holding unit 212 may be implemented by separated storage devices or a common storage device.

Figures 7, 8, 9:
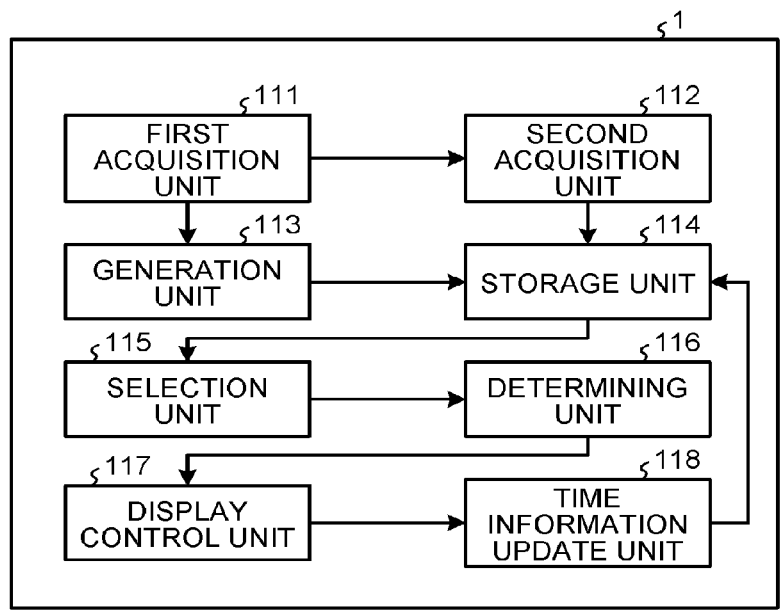
FIG. 7 is a schematic illustrating exemplary functions of the MFP in a first embodiment.
FIG. 8 is a schematic diagram illustrating an example of correspondence information corresponding to a copier state.
FIG. 9 is a schematic diagram illustrating an example of the correspondence information corresponding to a scanner state.

The following describes functions provided by the signage client application built in the MFP 1 (in the present example, the operation unit 20). FIG. 7 is a schematic diagram illustrating exemplary functions of the MFP 1. FIG. 7 exemplarily illustrates mainly the functions relating to the signage client application for expository convenience. The functions included in the MFP 1 are, however, not limited to those illustrated in FIG. 7.

As illustrated in FIG. 7, the MFP 1 includes a first acquisition unit 111, a second acquisition unit 112, a generation unit 113, a storage unit 114, a selection unit 115, a determining unit 116, a display control unit 117, and a time information update unit 118.

The first acquisition unit 111 acquires the content information from the content distribution server 2. In the present example, the first acquisition unit 111 transmits a content information request that requests the content information to the content distribution server 2. The content distribution server 2 (the first transmission unit 213) transmits the content information held in the first holding unit 211 to the MFP 1 as a response to the content information request received from the MFP 1. The first acquisition unit 111 acquires the content information as the response to the content information request.

The second acquisition unit 112 acquires, from the content distribution server 2, a plurality of contents respectively corresponding to a plurality of pieces of content identification information included in the content information acquired by the first acquisition unit 111. In the present example, the second acquisition unit 112 designates the content name included in the content information acquired by the first acquisition unit 111, and transmits, to the content distribution server 2, a content request that requests the content identified by the designated content name. The content distribution server 2 (the second transmission unit 214) transmits the content held in the second holding unit 212 to the MFP 1 as a response to the content request received from the MFP 1. The second acquisition unit 112 acquires the content as the response to the content request.

The generation unit 113 produces, for each of the plurality of states of the MFP 1, correspondence information that indicates either a correspondence relation between one or more pieces of content identification information respectively identifying one or more contents and time information indicating the latest times when the contents are displayed, or a correspondence relation between the one or more pieces of content identification information and frequency information representing display frequencies of the contents, based on the content information acquired by the first acquisition unit 111. In the first embodiment, each of the plurality of pieces of correspondence information respectively corresponding to the plurality of states of the MFP 1 is the information that indicates the correspondence relation between the one or more content names that identify the one or more contents to be displayed when the MFP 1 is placed in the corresponding state and time information indicating the latest times when the contents are displayed.

The following describes, as an example, a case where the first acquisition unit 111 acquires the content information illustrated in FIG. 6. The generation unit 113 produces, for each of the six states of the "copier state", the "scanner state", the "printer state", the "facsimile state", the "login state", and the "automatic reset state", the correspondence information that indicates the correspondence relation between the one or more content names identifying the one or more contents to be displayed when the MFP 1 is placed in the corresponding state and the time information. Thus, six pieces of correspondence information respectively corresponding to the six states are produced.

FIG. 8 is a schematic diagram illustrating the correspondence information that corresponds to the "copier state". As illustrated in FIG. 8, the contents to be displayed when the MFP 1 is placed in the "copy state" are the content identified by the content name "content A", the content identified by the content name "content D", and the content identified by the content name "content F", i.e., three contents. The present example illustrates the initial state (all of the contents are not displayed) of the correspondence information corresponding to the "copier state". The time information corresponding to each content name is thus set to the initial value "0000-00-00 00:00", which is based on the date and time notation of YYYY (year)-MM (month)-DD (day) hh (hour):mm (minute).

FIG. 9 is a schematic diagram illustrating the initial state of the correspondence information that corresponds to the "scanner state". FIG. 10 is a schematic diagram illustrating the initial state of the correspondence information that corresponds to the "printer state". FIG. 11 is a schematic diagram illustrating the initial state of the correspondence information that corresponds to the "facsimile state". FIG. 12 is a schematic diagram illustrating the initial state of the correspondence information that corresponds to the "login state". FIG. 13 is a schematic diagram illustrating the initial state of the correspondence information that corresponds to the "automatic reset state".

In the first embodiment, the display order of the one or more contents identified by the one or more content names included in the correspondence information is preliminarily determined. The correspondence information further includes designation information that designates the content name identifying the content to be displayed next out of the one or more content names included in the correspondence information. In the present example, the display order of the one or more contents identified by the one or more content names included in the correspondence information is from the top to the bottom of the arranged one or more content names. In the example illustrated in FIG. 8, the designation information designates the content name "content A" as first in the display order. Likewise, in the example illustrated in FIG. 9, the designation information designates the content name "content B" as first in the display order. Likewise, in the example illustrated in FIG. 10, the designation information designates the content name "content B" as first in the display order. Likewise, in the example illustrated in FIG. 11, the designation information designates the content name "content A" as first in the display order. Likewise, in the example illustrated in FIG. 12, the designation information designates the content name "content E" as first in the display order. Likewise, in the example illustrated in FIG. 13, the designation information designates the content name "content A" as first in the display order.

The display order of the contents can be arbitrarily set. For example, order information that indicates the display order of the content identified by the content name may be associated with each content name.

The following describes a basic rule of the display order of the three contents respectively corresponding to three content names included in the correspondence information based on the correspondence information that corresponds to the "copier state" as an example. It is assumed that the MFP 1 is placed in the first "copier state". In this case, the content identified by the content name "content A" indicated by the current designation information is displayed while "content D" just below "content A" is designated as the content name that identifies the content to be displayed next. As illustrated in FIG. 14, the designation information is changed to the information that designates the content name "content D". At this time, the time information corresponding to "content A" that identifies the content to be displayed is set to the date and time when the content is displayed (in the example illustrated in FIG. 14, "xxxx-xx-xx xx:xx").

Next, it is assumed that the MFP 1 is placed in the second "copier state". In this case, the content identified by the content name "content D" indicated by the current designation information is displayed while "content F" just below "content D" is designated as the content name that identifies the content to be displayed next. As illustrated in FIG. 15, the designation information is changed to the information that designates the content name "content F". At this time, the time information corresponding to "content D" that identifies the content to be displayed is set to the date and time when the content is displayed (in the example illustrated in FIG. 15, "yyyy-yy-yy yy:yy (>xxxx-xx-xx xx:xx)").

Next, it is assumed that the MFP 1 is placed in the third "copier state". In this case, the content identified by the content name "content F" indicated by the current designation information is displayed. The content name "content F" indicated by the current designation information is the content name arranged at the bottom. The content name "content A" at the top is thus designated as the content name that identifies the content to be displayed next. As illustrated in FIG. 16, the designation information is changed to the information that designates the content name "content A". At this time, the time information corresponding to "content F" that identifies the content to be displayed is set to the date and time when the content is displayed (in the example illustrated in FIG. 16, "zzzz-zz-zz zz:zz (>yyyy-yy-yy yy:yy)").

Next, it is assumed that the MFP 1 is placed in the fourth "copier state". In this case, the content identified by the content name "content A" indicated by the current designation information is displayed while "content D" just below "content A" is designated as the content name that identifies the content to be displayed next. As illustrated in FIG. 17, the designation information is changed to the information that designates the content name "content D". At this time, the time information corresponding to "content A" that identifies the content to be displayed is set to the date and time when the content is displayed (in the example illustrated in FIG. 17, "aaaa-aa-aa aa:aa (>zzzz-zz-zz zz:zz)").

Referring back to FIG. 7, the storage unit 114 stores therein a plurality of pieces of correspondence information produced by the generation unit 113. The storage unit 114 stores therein, for each of the plurality of states of the MFP 1, the correspondence information that indicates either a correspondence relation between one or more pieces of content identification information respectively identifying one or more contents and time information indicating the latest times when the contents are displayed, or a correspondence relation between the one or more pieces of content identification information and frequency information representing display frequencies of the contents. In the first embodiment, the storage unit 114 stores therein six pieces of correspondence information respectively corresponding to the six states of the MFP 1. In the first embodiment, the storage unit 114 also stores therein the plurality of contents acquired by the second acquisition unit 112.

The selection unit 115 selects the correspondence information corresponding to the current state of the MFP 1 out of the pieces of correspondence information (produced by the generation unit 113) stored in the storage unit 114. For example, when the MFP 1 is placed in the "copier state", the selection unit 115 selects the correspondence information corresponding to the "copier state" out of the plurality of pieces of correspondence information stored in the storage unit 114.

The determining unit 116 determines, as display content information identifying the content to be displayed, a piece of content identification information out of the one or more pieces of content identification information included in the correspondence information selected by the selection unit 115, based on the time information or the frequency information that corresponds to the one or more pieces of content identification information included in the correspondence information selected by the selection unit 115. In the first embodiment, the determining unit 116 determines, as the display content information, a content name out of the one or more content names included in the correspondence information selected by the selection unit 115, based on the time information corresponding to the one or more content names included in the correspondence information selected by the selection unit 115.

More specifically, out of the one or more pieces of content identification information (in this example, the content names) included in the corresponding information selected by the selection unit 115, the determining unit 116 identifies the content identification information designated by the designation information as "this-time display content information" that identifies the content displayed this time, and further identifies the content identification information next to the content identification information designated by the designation information in the display order as "next display content information" that identifies the content displayed next. Then, the determining unit 116 determines the display content information based on the time information corresponding to the this-time display content information and the time information corresponding to the next display content information. More specifically, when the time indicated by the time information corresponding to the this-time display content information is equal to or smaller (earlier) than the time indicated by the time information corresponding to the next display content information, the determining unit 116 determines the this-time display content information as the display content information; while when the time indicated by the time information corresponding to the this-time display content information is larger (later) than the time indicated by the time information corresponding to the next display content information, the determining unit 116 does not determine the this-time display content information as the display content information.

In the present example, when the time indicated by the time information corresponding to the this-time display content information is larger (later) than the time indicated by the time information corresponding to the next display content information, the determining unit 116 identifies, as the this-time display content information, the content identification information identified as the next display content information; and identifies, as the next display content information, the content identification information next to the content identification information identified as the next display content in the display order. Then, the determining unit 116 determines the display content information based on the time information corresponding to the identified this-time display content information and the time information corresponding to the identified next display content information. The process described above is repeated until the display content information is determined. The process is described in detail later.

In the present example, the determining unit 116 updates the designation information included in the correspondence information every time the display content information is determined out of the one or more content names included in the correspondence information selected by the selection unit 115. More specifically, the determining unit 116 changes the content name designated by the designation information included in the correspondence information selected by the selection unit 115 to the content name next to the content name determined as the display content information in the display order.

Referring back to FIG. 7, the display control unit 117 performs control to display the content identified by the display content information determined by the determining unit 116. In the present example, when the state of the MFP 1 transitions to the state that is not associated with the correspondence information (state other than the six states described above), the selection unit 115 cannot select the correspondence information. In this case, the selection unit 115 instructs the display control unit 117 to make the content non-displayed. Upon receiving the instruction, the display control unit 117 performs control to make the content non-displayed.

Every time the content is displayed by the display control unit 117, the time information update unit 118 identifies the one or more pieces of correspondence information including the content name identifying the displayed content out of the plurality of pieces of correspondence information respectively corresponding to the plurality of states of the MFP 1, and updates, for each of the identified one or more pieces of correspondence information, the time information corresponding to the content name included in the correspondence information to the information indicating the latest time when the content identified by the content name is displayed.

The following describes the specific operation examples of the operation unit 20 based on the following states of the MFP 1 at the respective dates and times.
(1) The copier state at 10:00 10th January 2015.
(2) The copier state at 10:01 10th January 2015.
(3) The scanner state at 12:20 10th January 2015.
(4) The automatic reset state at 13:15 10th January 2015.
(5) The automatic reset state at 18:00 12th January 2015.
(6) The facsimile state at 19:00 15th January 2015.
(7) The facsimile state at 20:05 16th January 2015.

In state (1), the selection unit 115 selects the correspondence information corresponding to the copier state. It is assumed that the correspondence information (correspondence information corresponding to the copier state) selected by the selection unit 115 is that illustrated in FIG. 8. The determining unit 116 identifies "content A" designated by the designation information as the this-time display content information out of the three content names (content A, content D, and content F) included in the correspondence information corresponding to the copier state. The determining unit 116 identifies content D next to content A designated by the designation information in the display order as the next display content information. In the present example, as illustrated in FIG. 8, the times indicated by the time information corresponding to content A identified as the this-time display content information and the time information corresponding to content D identified as the next display content information both indicate the initial values ("0000-00-00 00:00"). As a result, the following relation is held: the time indicated by the time information corresponding to the this-time display content information is equal to or smaller (earlier) than the time indicated by the time information corresponding to the next display content information. The determining unit 116 thus determines, as the display content information, content A identified as the this-time display content information. The determining unit 116 changes the content name designated by the designation information included in the correspondence information corresponding to the copier state to content D next to content A determined as the display content information in the display order. The display control unit 117 performs control to display the content identified by content A on the operation panel 27. The time information update unit 118 identifies three pieces of correspondence information (in the present example, the correspondence information corresponding to the copier state, the correspondence information corresponding to the facsimile state, and the correspondence information corresponding to the automatic reset state) including content A out of the six pieces of correspondence information respectively corresponding to the six states of the MFP 1, and updates, for each of the identified three pieces of correspondence information, the time information corresponding to content A included in the correspondence information to the information (in the present example, "10:00 10 Jan. 2015") that indicates the latest time when content A is displayed.

In state (2), the selection unit 115 selects the correspondence information corresponding to the copier state. In the present example, the correspondence information (correspondence information corresponding to the copier state) selected by the selection unit 115 is that illustrated in FIG. 18. The determining unit 116 identifies "content D" designated by the designation information as the this-time display content information out of the three content names (content A, content D, and content F) included in the correspondence information corresponding to the copier state. The determining unit 116 identifies content F next to content D designated by the designation information in the display order as the next display content information. In the present example, as illustrated in FIG. 18, the times indicated by the time information corresponding to content D identified as the this-time display content information and the time information corresponding to content F identified as the next display content information both indicate the initial values ("0000-00-00 00:00"). As a result, the following relation is held: the time indicated by the time information corresponding to the this-time display content information is equal to or smaller (earlier) than the time indicated by the time information corresponding to the next display content information. The determining unit 116 thus determines, as the display content information, content D identified as the this-time display content information. The determining unit 116 changes the content name designated by the designation information included in the correspondence information corresponding to the copier state to content F next to content D determined as the display content information in the display order. The display control unit 117 performs control to display the content identified by content D on the operation panel 27. The time information update unit 118 identifies three pieces of correspondence information (in the present example, the correspondence information corresponding to the copier state, the correspondence information corresponding to the printer state, and the correspondence information corresponding to the facsimile state) including content D out of the six pieces of correspondence information respectively corresponding to the six states of the MFP 1, and updates, for each of the identified three pieces of correspondence information, the time information corresponding to content D included in the correspondence information to the information (in the present example, "10:01 10th January 2015") that indicates the latest time when content D is displayed.

In state (3), the selection unit 115 selects the correspondence information corresponding to the scanner state. In the present example, it is assumed that the correspondence information (correspondence information corresponding to the scanner state) selected by the selection unit 115 is that illustrated in FIG. 9. The determining unit 116 identifies "content B" designated by the designation information as the this-time display content information out of the two content names (content B and content C) included in the correspondence information corresponding to the scanner state. The determining unit 116 identifies content C next to content B designated by the designation information in the display order as the next display content information. In the present example, as illustrated in FIG. 9, the times indicated by the time information corresponding to content B identified as the this-time display content information and the time information corresponding to content C identified as the next display content information both indicate the initial values. As a result, the following relation is held: the time indicated by the time information corresponding to the this-time display content information is equal to or smaller (earlier) than the time indicated by the time information corresponding to the next display content information. The determining unit 116 thus determines, as the display content information, content B identified as the this-time display content information. The determining unit 116 changes the content name designated by the designation information included in the correspondence information corresponding to the scanner state to content C next to content B determined as the display content information in the display order. The display control unit 117 performs control to display the content identified by content B on the operation panel 27. The time information update unit 118 identifies two pieces of correspondence information (in the present example, the correspondence information corresponding to the scanner state and the correspondence information corresponding to the printer state) including content B out of the six pieces of correspondence information respectively corresponding to the six states of the MFP 1, and updates, for each of the identified three pieces of correspondence information, the time information corresponding to content B included in the correspondence information to the information (in the present example, "12:20 10 Jan. 2015") that indicates the latest time when content B is displayed.

In state (4), the selection unit 115 selects the correspondence information corresponding to the automatic reset state. In the present example, the correspondence information (correspondence information corresponding to the automatic reset state) selected by the selection unit 115 is that illustrated in FIG. 19. The determining unit 116 identifies "content A" designated by the designation information as the this-time display content information out of the two content names (content A and content F) included in the correspondence information corresponding to the automatic reset state. The determining unit 116 identifies content F next to content A designated by the designation information in the display order as the next display content information. In the present example, as illustrated in FIG. 19, the time indicated by the time information corresponding to content A identified as the this-time display content information indicates "2015-01-10 10:00, i.e., 10:00 10 Jan. 2015") and the time indicated by the time information corresponding to content F identified as the next display content information indicates the initial value. As a result, the following relation is held: the time indicated by the time information corresponding to the this-time display content information is larger (later) than the time indicated by the time information corresponding to the next display content information. The determining unit 116 thus does not determine, as the display content information, content A identified as the this-time display content information; identifies, as the this-time display content information, content F identified as the next display content information; and identifies, as the next display content information, content A next to content F in the display order. In this case, the following relation is held: the time indicated by the time information corresponding to the this-time display content information is equal to or smaller (earlier) than the time indicated by the time information corresponding to the next display content information. The determining unit 116 thus determines, as the display content information, content F identified as the this-time display content information. The determining unit 116 changes the content name designated by the designation information included in the correspondence information corresponding to the automatic reset state to content A next to content F determined as the display content information in the display order (in the present example, the content name designated by the designation information remains as content A). The display control unit 117 performs control to display the content identified by content F on the operation panel 27. The time information update unit 118 identifies three pieces of correspondence information (in the present example, the correspondence information corresponding to the copier state, the correspondence information corresponding to the facsimile state, and the correspondence information corresponding to the automatic reset state) including content F out of the six pieces of correspondence information respectively corresponding to the six states of the MFP 1, and updates, for each of the identified three pieces of correspondence information, the time information corresponding to content F included in the correspondence information to the information (in the present example, "13:15 10 Jan. 2015") that indicates the latest time when content F is displayed.

In state (5), the selection unit 115 selects the correspondence information corresponding to the automatic reset state. In the present example, the correspondence information (correspondence information corresponding to the automatic reset state) selected by the selection unit 115 is that illustrated in FIG. 20. The determining unit 116 identifies "content A" designated by the designation information as the this-time display content information out of the two content names (content A and content F) included in the correspondence information corresponding to the automatic reset state. The determining unit 116 identifies content F next to content A designated by the designation information in the display order as the next display content information. In the present example, as illustrated in FIG. 20, the time indicated by the time information corresponding to content A identified as the this-time display content information indicates "2015-01-01 10:00, i.e., 10:00 10 Jan. 2015" and the time indicated by the time information corresponding to content F identified as the next display content information indicates "2015-01-10 13:15, i.e., 13:15 10 Jan. 2015". As a result, the following relation is held: the time indicated by the time information corresponding to the this-time display content information is equal to or smaller (earlier) than the time indicated by the time information corresponding to the next display content information. The determining unit 116 thus determines, as the display content information, content A identified as the this-time display content information. The determining unit 116 changes the content name designated by the designation information included in the correspondence information corresponding to the automatic reset state to content F next to content A determined as the display content information in the display order. The display control unit 117 performs control to display the content identified by content A on the operation panel 27. The time information update unit 118 identifies three pieces of correspondence information (in the present example, the correspondence information corresponding to the copier state, the correspondence information corresponding to the facsimile state, and the correspondence information corresponding to the automatic reset state) including content A out of the six pieces of correspondence information respectively corresponding to the six states of the MFP 1, and updates, for each of the identified three pieces of correspondence information, the time information corresponding to content A included in the correspondence information to the information (in the present example, "18:00 12 Jan. 2015") that indicates the latest time when content A is displayed.

In state (6), the selection unit 115 selects the correspondence information corresponding to the facsimile state. It is assumed that the correspondence information (correspondence information corresponding to the facsimile state) selected by the selection unit 115 is that illustrated in FIG. 21. The determining unit 116 identifies "content A" designated by the designation information as the this-time display content information out of the four content names (content A, content C, content D, and content F) included in the correspondence information corresponding to the facsimile state. The determining unit 116 identifies content C next to content A designated by the designation information in the display order as the next display content information. In the present example, as illustrated in FIG. 21, the time indicated by the time information corresponding to content A identified as the this-time display content information indicates "2015-01-12 18:00, i.e., 18:00 12 Jan. 2015") and the time indicated by the time information corresponding to content C identified as the next display content information indicates the initial value. As a result, the following relation is held: the time indicated by the time information corresponding to the this-time display content information is larger (later) than the time indicated by the time information corresponding to the next display content information. The determining unit 116 thus does not determine, as the display content information, content A identified as the this-time display content information; identifies, as the this-time display content information, content C identified as the next display content information; and identifies, as the next display content information, content D next to content C in the display order. In this case, as illustrated in FIG. 21, the time indicated by the time information corresponding to content C identified as the this-time display content information indicates the initial value and the time indicated by the time information corresponding to content D identified as the next display content information indicates "2015-01-10 10:01, i.e., 10:01 10th January 2015". As a result, the following relation is held: the time indicated by the time information corresponding to the this-time display content information is equal to or smaller (earlier) than the time indicated by the time information corresponding to the next display content information. The determining unit 116 thus determines, as the display content information, content C identified as the this-time display content information. The determining unit 116 changes the content name designated by the designation information included in the correspondence information corresponding to the facsimile state to content D next to content C determined as the display content information in the display order. The display control unit 117 performs control to display the content identified by content C on the operation panel 27. The time information update unit 118 identifies three pieces of correspondence information (in the present example, the correspondence information corresponding to the scanner state, the correspondence information corresponding to the printer state, and the correspondence information corresponding to the facsimile state) including content C out of the six pieces of correspondence information respectively corresponding to the six states of the MFP 1, and updates, for each of the identified three pieces of correspondence information, the time information corresponding to content C included in the correspondence information to the information (in the present example, "19:00 15 Jan. 2015") that indicates the latest time when content C is displayed.

In state (7), the selection unit 115 selects the correspondence information corresponding to the facsimile state. The correspondence information (correspondence information corresponding to the facsimile state) selected by the selection unit 115 is that illustrated in FIG. 22. The determining unit 116 identifies "content D" designated by the designation information as the this-time display content information out of the four content names (content A, content C, content D, and content F) included in the correspondence information corresponding to the facsimile state. The determining unit 116 identifies content F next to content D designated by the designation information in the display order as the next display content information. In the present example, as illustrated in FIG. 22, the time indicated by the time information corresponding to content D identified as the this-time display content information indicates "2015-01-10 10:01, i.e., 10:01 10 Jan. 2015" and the time indicated by the time information corresponding to content F identified as the next display content information indicates "2015-01-10 13:15, i.e., 13:15 10 Jan. 2015". As a result, the following relation is held: the time indicated by the time information corresponding to the this-time display content information is equal to or smaller (earlier) than the time indicated by the time information corresponding to the next display content information. The determining unit 116 thus determines, as the display content information, content D identified as the this-time display content information. The determining unit 116 changes the content name designated by the designation information included in the correspondence information corresponding to the facsimile state to content F next to content D determined as the display content information in the display order. The display control unit 117 performs control to display the content identified by content D on the operation panel 27. The time information update unit 118 identifies three pieces of correspondence information (in the present example, the correspondence information corresponding to the copier state, the correspondence information corresponding to the printer state, and the correspondence information corresponding to the facsimile state) including content D out of the six pieces of correspondence information respectively corresponding to the six states of the MFP 1, and updates, for each of the identified three pieces of correspondence information, the time information corresponding to content D included in the correspondence information to the information (in the present example, "20:05 16 Jan. 2015") that indicates the latest time when content D is displayed.

As described above, the display order of contents from state (1) to state (7) is as follows: content A in state (1)→content D in state (2)→content B in state (3)→content F in state (4)→content A in state (5)→content C in state (6)→content D in state (7). By contrast, when the contents to be displayed are determined based on the predetermined display order without taking into consideration the time information corresponding to the one or more content names included in the selection information selected by the selection unit 115, the display order of contents from state (1) to state (7) is as follows: content A in state (1)→content D in state (2)→content B in state (3)→content A in state (4)→content F in state (5)→content A in state (6)→content C in state (7). The number of times when content A is displayed is larger than that in the first embodiment. The first embodiment thus can prevent the display opportunity of content A from being increased compared with those of the other contents.

In the first embodiment, the this-time display content information is determined as the display content information only when the following relation is held: the time indicated by the time information corresponding to the this-time display content information is equal to or smaller (earlier) than the time indicated by the time information corresponding to the next display content information. When the relation described above is not held (when the following relation is held: the time indicated by the time information corresponding to the this-time display content information is larger (later) than the time indicated by the time information corresponding to the next display content information), the this-time display content information is not determined as the display content information; the content name identified as the next display content information is identified as the this-time display content information; the content name next to the content name identified as the next display content in the display order is identified as the next display content information. Then, the display content information is determined based on the time information corresponding to the identified this-time display content information and the time information corresponding to the identified next display content information. The process described above is repeated until the display content information is determined. As a result, the embodiment enables the display opportunity to be more equally allocated to all of the contents.

Figure 23:
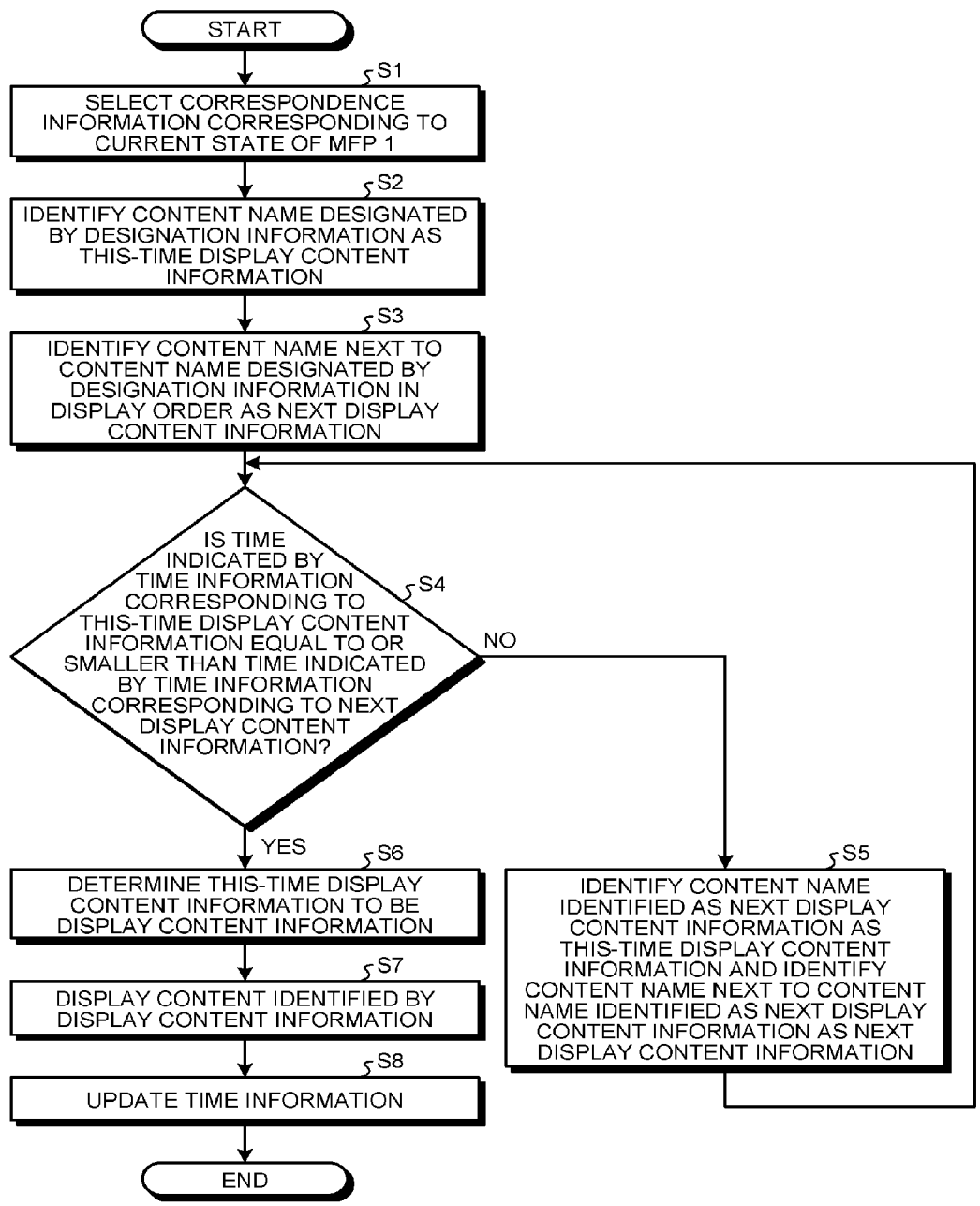
FIG. 23 is a flowchart illustrating an exemplary operation of the MFP in the first embodiment.

FIG. 23 is a flowchart illustrating an exemplary operation in the transition of the states of the MFP 1. As illustrated in FIG. 23, the selection unit 115 selects the correspondence information corresponding to the current state of the MFP 1 (step S1). The determining unit 116 identifies the content name designated by the designation information included in the correspondence information selected at step S1 as the this-time display content information (step S2). The determining unit 116 identifies the content name next to the content name designated by the designation information in the display order as the next display content information (step S3). The determining unit 116 determines whether the following relation is held: the time indicated by the time information corresponding to the this-time display content information is equal to or smaller (earlier) than the time indicated by the time information corresponding to the next display content information (step S4).

If a negative determination is made at step S4 (No at step S4), the determining unit 116 identifies, as the this-time display content information, the content name identified as the next display content information, and identifies, as the next display content information, the content name next to the content name identified as the next display content information in the display order (step S5). The process from step S4 onward is repeated.

By contrast, if a positive determination is made at step S4 (Yes at step S4), the determining unit 116 determines the this-time display content information as the display content information (step S6), and updates the designation information. The display control unit 117 performs control to display the content identified by the display content information (step S7). The time information update unit 118 updates, for each of the one or more pieces of correspondence information including the content name determined as the display content information, the time information corresponding to the content name included in the correspondence information to the information indicating the latest time when the content identified by the content name is displayed (step S8).

As described above, in first the embodiment, the correspondence information corresponding to the current state of the MFP 1 is selected out of the plurality of pieces of correspondence information respectively corresponding to the plurality of states of the MFP 1; a content name out of the one or more content names included in the selected correspondence information is determined as the display content information that identifies the content to be displayed, based on the time information corresponding to the one or more content names included in the selected correspondence information; and the content identified by the determined display content information is displayed.

More specifically, in the first embodiment, out of the one or more content names included in the selected correspondence information, the content name designated by the designation information is identified as the this-time display content information, and the content name next to the content name designated by the designation information in the display order is identified as the next display content information. Then, the display content information is determined based on the time information corresponding to the this-time display content information and the time information corresponding to the next display content information.

Furthermore, in the first embodiment, the this-time display content information is determined as the display content information only when the following relation is held: the time indicated by the time information corresponding to the this-time display content information is equal to or smaller (earlier) than the time indicated by the time information corresponding to the next display content information. When the relation described above is not held (when the following relation is held: the time indicated by the time information corresponding to the this-time display content information is larger (later) than the time indicated by the time information corresponding to the next display content information), the this-time display content information is not determined as the display content information; the content name identified as the next display content information is identified as the this-time display content information; and the content name next to the content name identified as the next display content in the display order is identified as the next display content information. Then, the display content information is determined based on the time information corresponding to the identified this-time display content information and the time information corresponding to the identified next display content information. The process described above is repeated until the display content information is determined. As a result, the embodiment enables the display opportunity to be more equally allocated to all of the contents.

Second Embodiment

The following describes a second embodiment. Descriptions in common with those of the first embodiment are appropriately omitted. In the second embodiment, each of the plurality of pieces of correspondence information respectively corresponding to the plurality of states of the MFP 1 is the information that indicates the correspondence relation between the one or more content names identifying the one or more contents to be displayed when the MFP 1 is placed in the corresponding state and the frequency information representing display frequencies of the contents. The display frequency may be the number of display times in a certain time period (e.g., a time period from the start of power supply to the MFP 1 to the stop of the power supply) or the accumulated number of display times without determining the time period.

FIG. 24 is a schematic diagram illustrating the initial state of the correspondence information that corresponds to the "copier state". FIG. 25 is a schematic diagram illustrating the initial state of the correspondence information that corresponds to the "scanner state". FIG. 26 is a schematic diagram illustrating the initial state of the correspondence information that corresponds to the "printer state". FIG. 27 is a schematic diagram illustrating the initial state of the correspondence information that corresponds to the "facsimile state". FIG. 28 is a schematic diagram illustrating the initial state of the correspondence information that corresponds to the "login state". FIG. 29 is a schematic diagram illustrating the initial state of the correspondence information that corresponds to the "automatic reset state". The correspondence information differs from that in the first embodiment in that the frequency information associated with each content is set to the initial value "zero".

Figures 30, 31, 32:
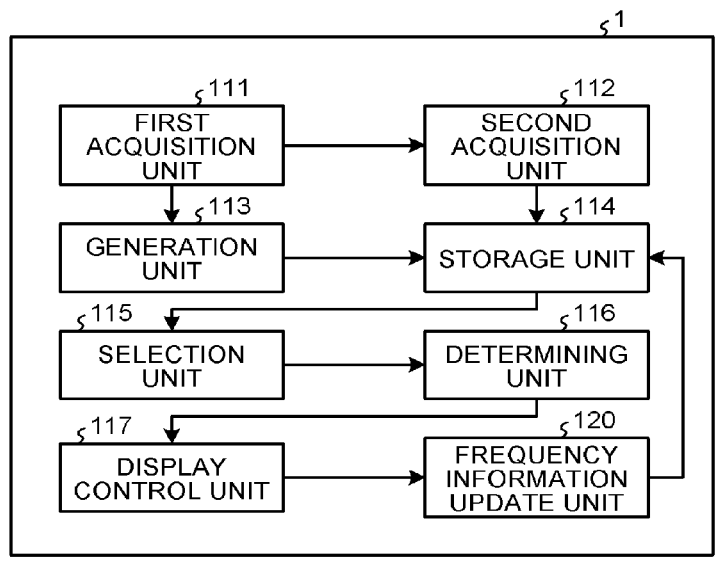
FIG. 30 is a schematic diagram illustrating exemplary functions of the MFP in a second embodiment.
FIG. 31 is a schematic diagram illustrating another example of the correspondence information corresponding to the copier state.
FIG. 32 is a schematic diagram illustrating another example of the correspondence information corresponding to the automatic reset state.

FIG. 30 is a schematic diagram illustrating exemplary functions of the MFP 1 in the second embodiment. As illustrated in FIG. 30, the MFP 1 differs from that of the first embodiment in that the MFP 1 includes a frequency information update unit 120 instead of the frequency information update unit 120. Every time the content is displayed by the display control unit 117, the frequency information update unit 120 identifies the one or more pieces of correspondence information including the content name identifying the content out of the plurality of pieces of correspondence information respectively corresponding to the plurality of states of the MFP 1, and updates, for each of the identified one or more pieces of correspondence information, the frequency information corresponding to the content name included in the correspondence information. In the present example, the frequency information update unit 120 updates, for each of the identified one or more pieces of correspondence information, the frequency information in such a manner that the display frequency indicated by the frequency information corresponding to the content name included in the correspondence information is counted up by "one".

In the second embodiment, the determining unit 116 determines, as the display content information, a piece of content identification information out of the one or more pieces of content identification information included in the correspondence information selected by the selection unit 115, based on the frequency information corresponding to the one or more pieces of content identification information (in the present example, the content names) included in the correspondence information selected by the selection unit 115.

More specifically, out of the one or more pieces of content identification information included in the correspondence information selected by the selection unit 115, the determining unit 116 identifies the content identification information designated by the designation information as the this-time display content information that identifies the content displayed this time, and further identifies the content identification information next to the content identification information designated by the designation information in the display order as the next display content information that identifies the content displayed next. Then, the determining unit 116 determines the display content information based on the frequency information corresponding to the this-time display content information and the frequency information corresponding to the next display content information. More specifically, when the display frequency indicated by the frequency information corresponding to the this-time display content information is equal to or smaller than the display frequency indicated by the frequency information corresponding to the next display content information, the determining unit 116 determines the this-time display content information as the display content information; while when the display frequency indicated by the frequency information corresponding to the this-time display content information is larger than the display frequency indicated by the frequency information corresponding to the next display content information, the determining unit 116 does not determine the this-time display content information as the display content information.

In the present example, when the display frequency indicated by the frequency information corresponding to the this-time display content information is larger than the display frequency indicated by the frequency information corresponding to the next display content information, the determining unit 116 identifies, as the this-time display content information, the content identification information identified as the next display content information; and identifies, as the next display content information, the content identification information next to the content identification information identified as the next display content in the display order. Then, the determining unit 116 determines the display content information based on the frequency information corresponding to the identified this-time display content information and the frequency information corresponding to the identified next display content information. The process described above is repeated until the display content information is determined.

The following describes the specific operation examples of the operation unit 20 based on the following states of the MFP 1 at the respective dates and times in the same manner as the first embodiment.

(1) The copier state at 10:00 10 Jan. 2015.
(2) The copier state at 10:01 10 Jan. 2015.
(3) The scanner state at 12:20 10 Jan. 2015.
(4) The automatic reset state at 13:15 10 Jan. 2015.
(5) The automatic reset state at 18:00 12 Jan. 2015.
(6) The facsimile state at 19:00 15 Jan. 2015.
(7) The facsimile state at 20:05 16 Jan. 2015.

In state (1), the selection unit 115 selects the correspondence information corresponding to the copier state. It is assumed that the correspondence information (correspondence information corresponding to the copier state) selected by the selection unit 115 is that illustrated in FIG. 24. The determining unit 116 identifies "content A" designated by the designation information as the this-time display content information out of the three content names (content A, content D, and content F) included in the correspondence information corresponding to the copier state. The determining unit 116 identifies content D next to content A designated by the designation information in the display order as the next display content information. In the present example, as illustrated in FIG. 24, the display frequencies indicated by the frequency information corresponding to content A identified as the this-time display content information and the frequency information corresponding to content D identified as the next display content information both indicate the initial values ("zero"). As a result, the following relation is held: the display frequency indicated by the frequency information corresponding to the this-time display content information is equal to or smaller than the display frequency indicated by the frequency information corresponding to the next display content information. The determining unit 116 thus determines, as the display content information, content A identified as the this-time display content information. The determining unit 116 changes the content name designated by the designation information included in the correspondence information corresponding to the copier state to content D next to content A determined as the display content information in the display order. The display control unit 117 performs control to display the content identified by content A on the operation panel 27. The frequency information update unit 120 identifies three pieces of correspondence information (in the present example, the correspondence information corresponding to the copier state, the correspondence information corresponding to the facsimile state, and the correspondence information corresponding to the automatic reset state) including content A out of the six pieces of correspondence information respectively corresponding to the six states of the MFP 1, and updates, for each of the identified three pieces of correspondence information, the frequency information corresponding to content A included in the correspondence information by counting up the display frequency indicated by the frequency information by "one" (in the present example, updated to "one" from "zero").

In state (2), the selection unit 115 selects the correspondence information corresponding to the copier state. In the present example, the correspondence information (correspondence information corresponding to the copier state) selected by the selection unit 115 is that illustrated in FIG. 31. The determining unit 116 identifies "content D" designated by the designation information as the this-time display content information out of the three content names (content A, content D, and content F) included in the correspondence information corresponding to the copier state. The determining unit 116 identifies content F next to content D designated by the designation information in the display order as the next display content information. In the present example, as illustrated in FIG. 31, the display frequencies indicated by the frequency information corresponding to content D identified as the this-time display content information and the frequency information corresponding to content F identified as the next display content information both indicate the initial values ("zero"). As a result, the following relation is held: the display frequency indicated by the frequency information corresponding to the this-time display content information is equal to or smaller than the display frequency indicated by the frequency information corresponding to the next display content information. The determining unit 116 thus determines, as the display content information, content D identified as the this-time display content information. The determining unit 116 changes the content name designated by the designation information included in the correspondence information corresponding to the copier state to content F next to content D determined as the display content information in the display order. The display control unit 117 performs control to display the content identified by content D on the operation panel 27. The frequency information update unit 120 identifies three pieces of correspondence information (in the present example, the correspondence information corresponding to the copier state, the correspondence information corresponding to the printer state, and the correspondence information corresponding to the facsimile state) including content D out of the six pieces of correspondence information respectively corresponding to the six states of the MFP 1, and updates, for each of the identified three pieces of correspondence information, the frequency information corresponding to content D included in the correspondence information by counting up the display frequency indicated by the frequency information by "one" (in the present example, updated to "one" from "zero").

In state (3), the selection unit 115 selects the correspondence information corresponding to the scanner state. In the present example, it is assumed that the correspondence information (correspondence information corresponding to the scanner state) selected by the selection unit 115 is that illustrated in FIG. 25. The determining unit 116 identifies "content B" designated by the designation information as the this-time display content information out of the two content names (content B and content C) included in the correspondence information corresponding to the scanner state. The determining unit 116 identifies content C next to content B designated by the designation information in the display order as the next display content information. In the present example, as illustrated in FIG. 25, the display frequencies indicated by the frequency information corresponding to content B identified as the this-time display content information and the frequency information corresponding to content C identified as the next display content information both indicate the initial values. As a result, the following relation is held: the display frequency indicated by the frequency information corresponding to the this-time display content information is equal to or smaller than the display frequency indicated by the frequency information corresponding to the next display content information. The determining unit 116 thus determines, as the display content information, content B identified as the this-time display content information. The determining unit 116 changes the content name designated by the designation information included in the correspondence information corresponding to the scanner state to content C next to content B determined as the display content information in the display order. The display control unit 117 performs control to display the content identified by content B on the operation panel 27. The time frequency update unit 120 identifies two pieces of correspondence information (in the present example, the correspondence information corresponding to the scanner state and the correspondence information corresponding to the printer state) including content B out of the six pieces of correspondence information respectively corresponding to the six states of the MFP 1, and updates, for each of the identified two pieces of correspondence information, the frequency information corresponding to content B included in the correspondence information by counting up the display frequency indicated by the frequency information by "one" (in the present example, updated to "one" from "zero").

In state (4), the selection unit 115 selects the correspondence information corresponding to the automatic reset state. In the present example, the correspondence information (correspondence information corresponding to the automatic reset state) selected by the selection unit 115 is that illustrated in FIG. 32. The determining unit 116 identifies "content A" designated by the designation information as the this-time display content information out of the two content names (content A and content F) included in the correspondence information corresponding to the automatic reset state. The determining unit 116 identifies content F next to content A designated by the designation information in the display order as the next display content information. In the present example, as illustrated in FIG. 32, the display frequency indicated by the frequency information corresponding to content A identified as the this-time display content information indicates "one", and the display frequency indicated by the frequency information corresponding to content F identified as the next display content information indicates the initial value. As a result, the following relation is held: the display frequency indicated by the frequency information corresponding to the this-time display content information is larger than the display frequency indicated by the frequency information corresponding to the next display content information. The determining unit 116 thus does not determine, as the display content information, content A identified as the this-time display content information; identifies, as the this-time display content information, content F identified as the next display content information; and identifies, as the next display content information, content A next to content F in the display order. In this case, the following relation is held: the display frequency indicated by the frequency information corresponding to the this-time display content information is equal to or smaller than the display frequency indicated by the frequency information corresponding to the next display content information. The determining unit 116 thus determines, as the display content information, content F identified as the this-time display content information. The determining unit 116 changes the content name designated by the designation information included in the correspondence information corresponding to the automatic reset state to content A next to content F determined as the display content information in the display order. The display control unit 117 performs control to display the content identified by content F on the operation panel 27. The time frequency update unit 120 identifies three pieces of correspondence information (in the present example, the correspondence information corresponding to the copier state, the correspondence information corresponding to the facsimile state, and the correspondence information corresponding to the automatic reset state) including content F out of the six pieces of correspondence information respectively corresponding to the six states of the MFP 1, and updates, for each of the identified three pieces of correspondence information, the frequency information corresponding to content F included in the correspondence information by counting up the display frequency indicated by the frequency information by "one" (in the present example, updated to "one" from "zero").

In state (5), the selection unit 115 selects the correspondence information corresponding to the automatic reset state. In the present example, the correspondence information (correspondence information corresponding to the automatic reset state) selected by the selection unit 115 is that illustrated in FIG. 33. The determining unit 116 identifies "content A" designated by the designation information as the this-time display content information out of the two content names (content A and content F) included in the correspondence information corresponding to the automatic reset state. The determining unit 116 identifies content F next to content A designated by the designation information in the display order as the next display content information. In the present example, as illustrated in FIG. 33, the display frequency indicated by the frequency information corresponding to content A identified as the this-time display content information indicates "one", and the display frequency indicated by the frequency information corresponding to content F identified as the next display content information also indicates "one". As a result, the following relation is held: the display frequency indicated by the frequency information corresponding to the this-time display content information is equal to or smaller than the display frequency indicated by the frequency information corresponding to the next display content information. The determining unit 116 thus determines, as the display content information, content A identified as the this-time display content information. The determining unit 116 changes the content name designated by the designation information included in the correspondence information corresponding to the automatic reset state to content F next to content A determined as the display content information in the display order. The display control unit 117 performs control to display the content identified by content A on the operation panel 27. The frequency information update unit 120 identifies three pieces of correspondence information (in the present example, the correspondence information corresponding to the copier state, the correspondence information corresponding to the facsimile state, and the correspondence information corresponding to the automatic reset state) including content A out of the six pieces of correspondence information respectively corresponding to the six states of the MFP 1, and updates, for each of the identified three pieces of correspondence information, the frequency information corresponding to content A included in the correspondence information by counting up the display frequency indicated by the frequency information by "one" (in the present example, updated to "two" from "one").

In state (6), the selection unit 115 selects the correspondence information corresponding to the facsimile state. It is assumed that the correspondence information (correspondence information corresponding to the facsimile state) selected by the selection unit 115 is that illustrated in FIG. 34. The determining unit 116 identifies "content A" designated by the designation information as the this-time display content information out of the four content names (content A, content C, content D, and content F) included in the correspondence information corresponding to the facsimile state. The determining unit 116 identifies content C next to content A designated by the designation information in the display order as the next display content information. In the present example, as illustrated in FIG. 34, the display frequency indicated by the frequency information corresponding to content A identified as the this-time display content information indicates "two", and the display frequency indicated by the frequency information corresponding to content C identified as the next display content information indicates the initial value ("zero"). As a result, the following relation is held: the display frequency indicated by the frequency information corresponding to the this-time display content information is larger than the display frequency indicated by the frequency information corresponding to the next display content information. The determining unit 116 thus does not determine, as the display content information, content A identified as the this-time display content information; identifies, as the this-time display content information, content C identified as the next display content information; and identifies, as the next display content information, content D next to content C in the display order. In this case, as illustrated in FIG. 34, the display frequency indicated by the frequency information corresponding to content C identified as the this-time display content information indicates the initial value, and the display frequency indicated by the frequency information corresponding to content D identified as the next display content information indicates "one". As a result, the following relation is held: the display frequency indicated by the frequency information corresponding to the this-time display content information is equal to or smaller than the display frequency indicated by the frequency information corresponding to the next display content information. The determining unit 116 thus determines, as the display content information, content C identified as the this-time display content information. The determining unit 116 changes the content name designated by the designation information included in the correspondence information corresponding to the facsimile state to content D next to content C determined as the display content information in the display order. The display control unit 117 performs control such that the content identified by content C is displayed on the operation panel 27. The frequency information update unit 120 identifies three pieces of correspondence information (in the present example, the correspondence information corresponding to the scanner state, the correspondence information corresponding to the printer state, and the correspondence information corresponding to the facsimile state) including content C out of the six pieces of correspondence information respectively corresponding to the six states of the MFP 1, and updates, for each of the identified three pieces of correspondence information, the frequency information corresponding to content C included in the correspondence information by counting up the display frequency indicated by the frequency information by "one" (in the present example, updated to "one" from "zero").

In state (7), the selection unit 115 selects the correspondence information corresponding to the facsimile state. The correspondence information (correspondence information corresponding to the facsimile state) selected by the selection unit 115 is that illustrated in FIG. 35. The determining unit 116 identifies "content D" designated by the designation information as the this-time display content information out of the four content names (content A, content C, content D, and content F) included in the correspondence information corresponding to the facsimile state. The determining unit 116 identifies content F next to content D designated by the designation information in the display order as the next display content information. In the present example, as illustrated in FIG. 35, the display frequency indicated by the frequency information corresponding to content D identified as the this-time display content information indicates "one", and the display frequency indicated by the frequency information corresponding to content F identified as the next display content information also indicates "one". As a result, the following relation is held: the display frequency indicated by the frequency information corresponding to the this-time display content information is equal to or smaller than the display frequency indicated by the frequency information corresponding to the next display content information. The determining unit 116 thus determines, as the display content information, content D identified as the this-time display content information. The determining unit 116 changes the content name designated by the designation information included in the correspondence information corresponding to the facsimile state to content F next to content D determined as the display content information in the display order. The display control unit 117 performs control to display the content identified by content D on the operation panel 27. The frequency information update unit 120 identifies three pieces of correspondence information (in the present example, the correspondence information corresponding to the copier state, the correspondence information corresponding to the printer state, and the correspondence information corresponding to the facsimile state) including content D out of the six pieces of correspondence information respectively corresponding to the six states of the MFP 1, and updates, for each of the identified three pieces of correspondence information, the frequency information corresponding to content D included in the correspondence information by counting up the display frequency indicated by the frequency information by "one" (in the present example, updated to "two" from "one").

As described above, the display order of contents from state (1) to state (7) is as follows: content A in state (1)→content D in state (2)→content B in state (3)→content F in state (4)→content A in state (5)→content C in state (6)→content D in state (7), in the same manner as the first embodiment. By contrast, when the contents to be displayed are determined based on the predetermined display order without taking into consideration the frequency information corresponding to the one or more content names included in the selection information selected by the selection unit 115, the display order of contents from state (1) to state (7) is as follows: content A in state (1)→content D in state (2)→content B in state (3)→content A in state (4)→content F in state (5)→content A in state (6)→content C in state (7). The number of times when content A is displayed is larger than that in the embodiment. The second embodiment thus can prevent the display opportunity of content A from being increased compared with those of the other contents.

In the second embodiment, the this-time display content information is determined as the display content information only when the following relation is held: the display frequency indicated by the frequency information corresponding to the this-time display content information is equal to or smaller than the display frequency indicated by the frequency information corresponding to the next display content information. When the relation described above is not held (when the following relation is held: the display frequency indicated by the frequency information corresponding to the this-time display content information is larger than the display information indicated by the frequency information corresponding to the next display content information), the this-time display content information is not determined as the display content information; the content name identified as the next display content information is identified as the this-time display content information; and the content name next to the content name identified as the next display content in the display order is identified as the next display content information. Then, the display content information is determined based on the frequency information corresponding to the identified this-time display content information and the frequency information corresponding to the identified next display content information. The process described above is repeated until the display content information is determined. As a result, the embodiment enables the display opportunity to be more equally allocated to all of the contents.

Figure 36:
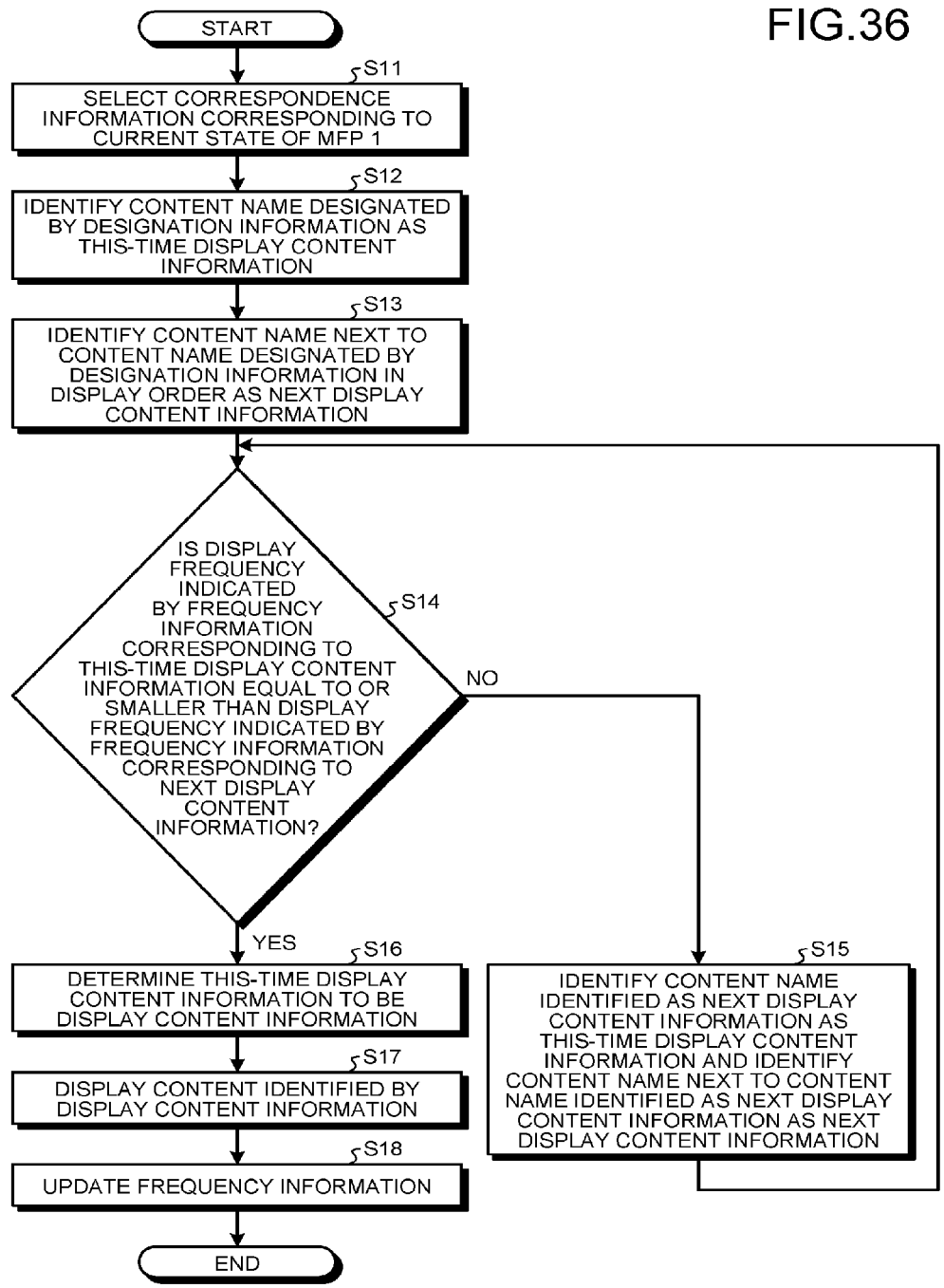
FIG. 36 is a flowchart illustrating an exemplary operation of the MFP in the second embodiment.

FIG. 36 is a flowchart illustrating an exemplary operation in the transition of the states of the MFP 1. As illustrated in FIG. 36, the selection unit 115 selects the correspondence information corresponding to the current state of the MFP 1 (step S11). The determining unit 116 identifies the content name designated by the designation information included in the correspondence information selected at step S11 as the this-time display content information (step S12). The determining unit 116 identifies the content name next to the content name designated by the designation information in the display order as the next display content information (step S13). The determining unit 116 determines whether the following relation is held: the display frequency indicated by the frequency information corresponding to the this-time display content information is equal to or smaller than the display frequency indicated by the frequency information corresponding to the next display content information (step S14).

If the negative determination is made at step S14 (No at step S14), the determining unit 116 identifies, as the this-time display content information, the content name identified as the next display content information, and identifies, as the next display content information, the content name next to the content name identified as the next display content information in the display order (step S15). The process from step S14 onward is repeated.

By contrast, if the positive determination is made at step S14 (Yes at step S14), the determining unit 116 determines the this-time display content information as the display content information (step S16), and updates the designation information. The display control unit 117 performs control to display the content identified by the display content information (step S17). The frequency information update unit 120 updates, for each of the one or more pieces of correspondence information including the content name determined as the display content information, the frequency information corresponding to the content name included in the correspondence information in such a manner that the display frequency indicated by the frequency information is counted up by "one" (step S18).

In the embodiments described above, the main body 10 and the operation unit 20 operate under different operating systems. The embodiments are, however, not limited thereto. For example, the main body 10 and the operation unit 20 may operate under the same operating system.

The respective functions of the MFP 1 (the first acquisition unit 111, the second acquisition unit 112, the generation unit 113, the selection unit 115, the determining unit 116, the display control unit 117, the time information update unit 118, and the frequency information update unit 120) are implemented by the CPU (11 or 21) executing a computer program stored in the storage device (e.g., the ROM 12, the HDD 14, the ROM 22, and the flash memory 24). The embodiments are, however, not limited thereto. For example, at least part of the respective functions of the MFP 1 may be implemented by a dedicated hardware circuit (e.g., a semiconductor integrated circuit).

A computer program executed by the information processing system 100 (e.g., the MFP 1 and the content distribution server 2) of the embodiments may be recorded and provided in a computer-readable recording medium such as a compact disc ROM (CD-ROM), a flexible disk (FD), a CD-recordable (CD-R), a digital versatile disc (DVD), and a universal serial bus (USB), as an installable or executable file. The program may be provided or distributed via a network such as the Internet. The various programs may be embedded and provided in a ROM, for example.

The present invention has an advantage of enabling the display opportunity to be more equally allocated to all of the contents.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. An information processing apparatus comprising:
a memory to store, for each of a plurality of states of the information processing apparatus, pieces of correspondence information indicating either a correspondence relation between one or more pieces of content identification information respectively identifying one or more contents and time information indicating latest times when the contents are displayed, or a correspondence relation between the one or more pieces of content identification information and frequency information representing display frequencies of the contents;
selection processing circuitry configured to select correspondence information corresponding to a current state of the information processing apparatus out of the pieces of correspondence information stored in the memory;
determining processing circuitry configured to determine, as display content information that identifies the content to be displayed, a piece of content identification information out of the one or more pieces of content identification information included in the correspondence information selected by the selection processing circuitry, based on the time information or the frequency information that corresponds to the one or more pieces of content identification information included in the correspondence information selected by the selection processing circuitry; and
display control processing circuitry configured to perform control to display the content identified by the display content information determined by the determining processing circuitry,
wherein:
a display order of the one or more contents identified by the one or more pieces of content identification information included in the correspondence information is preliminarily determined, and
the correspondence information further includes designation information that designates the content identification information identifying the content to be displayed next out of the one or more pieces of content identification information included in the correspondence information.

2. The information processing apparatus according to claim 1, wherein the determining processing circuitry:
identifies the content identification information designated by the designation information as this-time display content information that identifies the content displayed this time out of the one or more pieces of content identification information included in the correspondence information selected by the selection processing circuitry,
identifies the content identification information next to the content identification information designated by the designation information in the display order as next display content information that identifies the content displayed next, and
determines the display content information based on the time information corresponding to the this-time display content information and the time information corresponding to the next display content information.

3. The information processing apparatus according to claim 2, wherein,
when a time indicated by the time information corresponding to the this-time display content information is equal to or smaller than a time indicated by the time information corresponding to the next display content information, the determining processing circuitry determines the this-time display content information as the display content information, while when a time indicated by the time information corresponding to the this-time display content information is larger than a time indicated by the time information corresponding to the next display content information, the determining processing circuitry does not determine the this-time display content information as the display content information.

4. The information processing apparatus according to claim 3, wherein, when a time indicated by the time information corresponding to the this-time display content information is larger than a time indicated by the time information corresponding to the next display content information, the determining processing circuitry:
identifies, as the this-time display content information, the content identification information identified as the next display content information,
identifies, as the next display content information, the content identification information next to the content identification information identified as the next display content information in the display order, and
determines the display content information based on the time information corresponding to the identified this-time display content information and the time information corresponding to the identified next display content information.

5. The information processing apparatus according to claim 1, wherein the determining processing circuitry:
identifies, as this-time display content information that identifies the content displayed this time, the content identification information designated by the designation information out of the one or more pieces of content identification information included in the correspondence information selected by the selection processing circuitry,
identifies, as next display content information that identifies the content displayed next, the content identification information next to the content identification information designated by the designation information in the display order, and
determines the display content information based on the frequency information corresponding to the this-time display content information and the frequency information corresponding to the next display content information.

6. The information processing apparatus according to claim 5, wherein,
when a display frequency indicated by the frequency information corresponding to the this-time display content information is equal to or smaller than a display frequency indicated by the frequency information corresponding to the next display content information, the determining processing circuitry determines the this-time display content information as the display content information, while when a display frequency indicated by the frequency information corresponding to the this-time display content information is larger than a display frequency indicated by the frequency information corresponding to the next display content information, the determining processing circuitry does not determine the this-time display content information as the display content information.

7. The information processing apparatus according to claim 6, wherein, when a display frequency indicated by the frequency information corresponding to the this-time display content information is larger than a display frequency indicated by the frequency information corresponding to the next display content information, the determining processing circuitry:
identifies, as the this-time display content information, the content identification information identified as the next display content information,
identifies, as the next display content information, the content identification information next to the content identification information identified as the next display content information in the predetermined display order, and
determines the display content information based on the frequency information corresponding to the identified this-time display content information and the frequency information corresponding to the identified next display content information.

8. An information processing method, comprising:
selecting correspondence information corresponding to a current state of an information processing apparatus out of pieces of correspondence information stored in a memory that stores, for each of a plurality of states of the information processing apparatus, the pieces of correspondence information indicating either a correspondence relation between one or more pieces of content identification information respectively identifying one or more contents and time information indicating latest times when the contents are displayed, or a correspondence relation between the one or more pieces of content identification information and frequency information representing display frequencies of the contents;
determining, as display content information that identifies the content to be displayed, a piece of content identification information out of the one or more pieces of content identification information included in the correspondence information selected at the selecting, based on the time information or the frequency information that corresponds to the one or more pieces of content identification information included in the correspondence information selected at the selecting; and
performing control to display the content identified by the display content information determined at the determining,
wherein:
a display order of the one or more contents identified by the one or more pieces of content identification information included in the correspondence information is preliminarily determined, and
the correspondence information further includes designation information that designates the content identification information identifying the content to be displayed next out of the one or more pieces of content identification information included in the correspondence information.

9. An information processing system comprising:
a server; and
an information processing apparatus, wherein
the server includes:

a first memory configured to hold content information in which each of a plurality of pieces of content identification information each identifying any one out of a plurality of contents is associated with at least one or more states of the information processing apparatus, and which indicates that when the information processing apparatus is placed in any of the one or more states, the content identified by the content identification information is to be displayed;

a second memory configured to hold the plurality of contents respectively corresponding to the plurality of pieces of content identification information included in the content information;

a first transmitter configured to transmit the content information held by the first memory to the information processing apparatus in accordance with a request from the information processing apparatus; and a second transmitter configured to transmit the contents held by the second memory to the information processing apparatus in accordance with a request from the information processing apparatus, and the information processing apparatus includes:

first acquisition processing circuitry configured to acquire the content information;

second acquisition processing circuitry configured to acquire the plurality of contents respectively corresponding to the plurality of pieces of content identification information included in the content information acquired by the first acquisition processing circuitry;

generation processing circuitry configured to produce, for each of the states of the information processing apparatus, correspondence information that indicates either a correspondence relation between the one or more pieces of content identification information and time information indicating latest times when the contents are displayed, or a correspondence relation between the one or more pieces of content identification information and frequency information representing display frequencies of the contents, based on the content information acquired by the first acquisition processing circuitry;

selection processing circuitry configured to select the correspondence information corresponding to a current state of the information processing apparatus out of the pieces of correspondence information produced by the generation processing circuitry;

determining processing circuitry configured to determine, as display content information identifying the content to be displayed out of the one or more pieces of content identification information included in the correspondence information selected by the selection processing circuitry, based on the time information or the frequency information that corresponds to the one or more pieces of content identification information included in the correspondence information selected by the selection processing circuitry; and a display control processing circuitry configured to perform control to display the content identified by the display content information determined by the determining processing circuitry, wherein:

a display order of the one or more contents identified by the one or more pieces of content identification information included in the correspondence information is preliminarily determined, and the correspondence information further includes designation information that designates the content identification information identifying the content to be displayed next out of the one or more pieces of content identification information included in the correspondence information.

* * * * *